(12) United States Patent
Li et al.

(10) Patent No.: US 11,102,653 B2
(45) Date of Patent: *Aug. 24, 2021

(54) PROTECTION FROM COUNTERFEIT RANGING

(71) Applicant: Intel Corporation, Santa Clara, CA (US)

(72) Inventors: Qinghua Li, San Ramon, CA (US); Feng Jiang, Santa Clara, CA (US); Jonathan Segev, Sunnyvale, CA (US); Xiaogang Chen, Hillsboro, OR (US); Robert J. Stacey, Portland, OR (US)

(73) Assignee: Intel Corporation, Santa Clara, CA (US)

(*) Notice: Subject to any disclaimer, the term of this patent is extended or adjusted under 35 U.S.C. 154(b) by 336 days.

This patent is subject to a terminal disclaimer.

(21) Appl. No.: 16/215,182

(22) Filed: Dec. 10, 2018

(65) Prior Publication Data

US 2019/0182674 A1 Jun. 13, 2019

Related U.S. Application Data

(60) Provisional application No. 62/597,302, filed on Dec. 11, 2017.

(51) Int. Cl.
| | |
|---|---|
| *H04W 12/122* | (2021.01) |
| *H04W 12/041* | (2021.01) |
| *H04L 27/26* | (2006.01) |
| *H04W 12/06* | (2021.01) |
| *H04L 9/08* | (2006.01) |
| *G01S 13/76* | (2006.01) |
| *H04L 25/02* | (2006.01) |

(Continued)

(52) U.S. Cl.
CPC ......... *H04W 12/122* (2021.01); *G01S 13/765* (2013.01); *G01S 13/767* (2013.01);
(Continued)

(58) Field of Classification Search
USPC .......................................................... 713/171
See application file for complete search history.

(56) References Cited

U.S. PATENT DOCUMENTS 10,631,187 B1 * 4/2020 Chu ........................ H04W 24/10
2009/0310524 A1 * 12/2009 Katsube ................... H04L 7/041
370/311

(Continued)

FOREIGN PATENT DOCUMENTS

WO WO-2015130712 A1 * 9/2015 ............... G01S 1/08

*Primary Examiner* — Eleni A Shiferaw
*Assistant Examiner* — Sakinah White Taylor
(74) *Attorney, Agent, or Firm* — Schwegman Lundberg & Woessner, P.A.

(57) ABSTRACT

Methods, apparatuses, and computer readable media for location measurement reporting in a wireless network are disclosed. An apparatus of a responder station (RSTA) is disclosed, the apparatus including processing circuitry configured to decode a null data packet (NDP) announce (NDPA) frame from an initiator station (ISTA), the NDPA frame including an indication of a temporary key and an identification of the RSTA. The processing circuitry further configured to decode a NDP from the ISTA, the NDP including long training fields (LTFs), the NDP received on a channel. The processing circuitry further configured to determine whether the NDP from the ISTA is consistent with the NDP being generated using a temporary key shared between the ISTA and RSTA based on a comparison of the channel estimates. The processing circuitry may be further configured to determine for authentication whether the indication of the temporary key was generated based on the temporary key.

20 Claims, 15 Drawing Sheets

(51) Int. Cl.
*G01S 13/78* (2006.01)
*H04W 84/12* (2009.01)
*H04W 88/02* (2009.01)

(52) U.S. Cl.
CPC ............ *H04L 9/08* (2013.01); *H04L 25/0224* (2013.01); *H04L 27/2602* (2013.01); *H04L 27/2605* (2013.01); *H04L 27/2613* (2013.01); *H04W 12/041* (2021.01); *H04W 12/06* (2013.01); *G01S 13/788* (2013.01); *H04L 2209/80* (2013.01); *H04W 84/12* (2013.01); *H04W 88/02* (2013.01)

(56) References Cited

U.S. PATENT DOCUMENTS

| | | | | |
|---|---|---|---|---|
| 2010/0136920 A1* | 6/2010 | Shrivastava | .......... | H04W 28/06 455/67.11 |
| 2013/0272137 A1* | 10/2013 | Kwon | .................. | H04W 74/04 370/241 |
| 2014/0036934 A1* | 2/2014 | Buckley | ............ | H04L 25/03343 370/474 |
| 2014/0286238 A1* | 9/2014 | Erceg | .................... | H04W 80/00 370/328 |
| 2016/0149621 A1* | 5/2016 | Trainin | ................. | H04W 88/08 375/267 |
| 2017/0033898 A1* | 2/2017 | Chun | .................... | H04B 7/0452 |
| 2017/0033963 A1* | 2/2017 | Li | ........................ | H04L 27/2615 |
| 2017/0150493 A1* | 5/2017 | Seok | ..................... | H04B 7/0452 |
| 2017/0171766 A1* | 6/2017 | Amizur | ................. | H04W 24/08 |
| 2017/0280446 A1* | 9/2017 | Itagaki | .................. | H04L 5/0048 |
| 2017/0289933 A1* | 10/2017 | Segev | .................... | H04B 17/27 |
| 2017/0324549 A1* | 11/2017 | Abramovsky | ........ | H04W 12/03 |
| 2018/0007701 A1* | 1/2018 | Adachi | ................. | H04W 48/08 |
| 2018/0115424 A1* | 4/2018 | Bhandaru | ............. | H04L 9/0844 |
| 2018/0192431 A1* | 7/2018 | Wang | ................ | H04W 28/0278 |
| 2018/0263047 A1* | 9/2018 | Kim | .................... | H04L 5/0053 |
| 2019/0165883 A1* | 5/2019 | Chun | .................... | H04L 1/0026 |

* cited by examiner

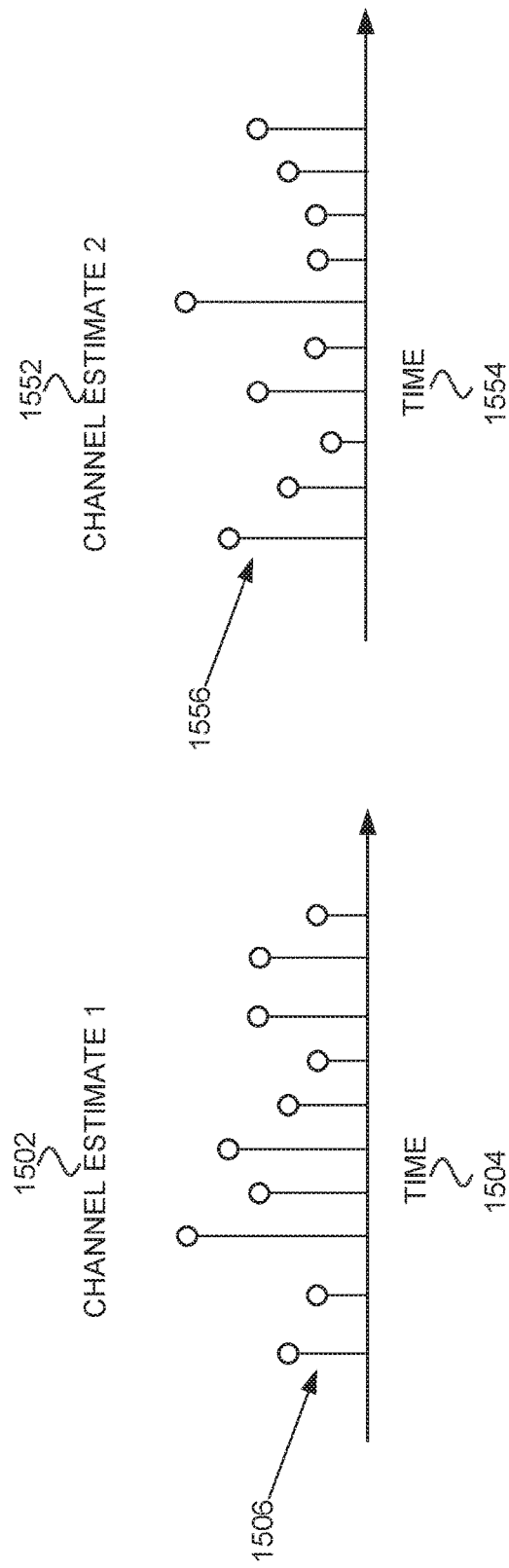
FIG. 14
FIG. 15

US 11,102,653 B2

PROTECTION FROM COUNTERFEIT RANGING

PRIORITY CLAIM

This application claims the benefit of priority under 35 USC 119(e) to U.S. Provisional Patent Application Ser. No. 62/597,302, filed Dec. 11, 2017, which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11az, IEEE 802.11ax, and/or IEEE 802.11 extremely high-throughput (EHT). Some embodiments relate to secure ranging and location measurement reporting (LMR).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIGS. 14 and 15 illustrate channel estimates from different NDPs;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
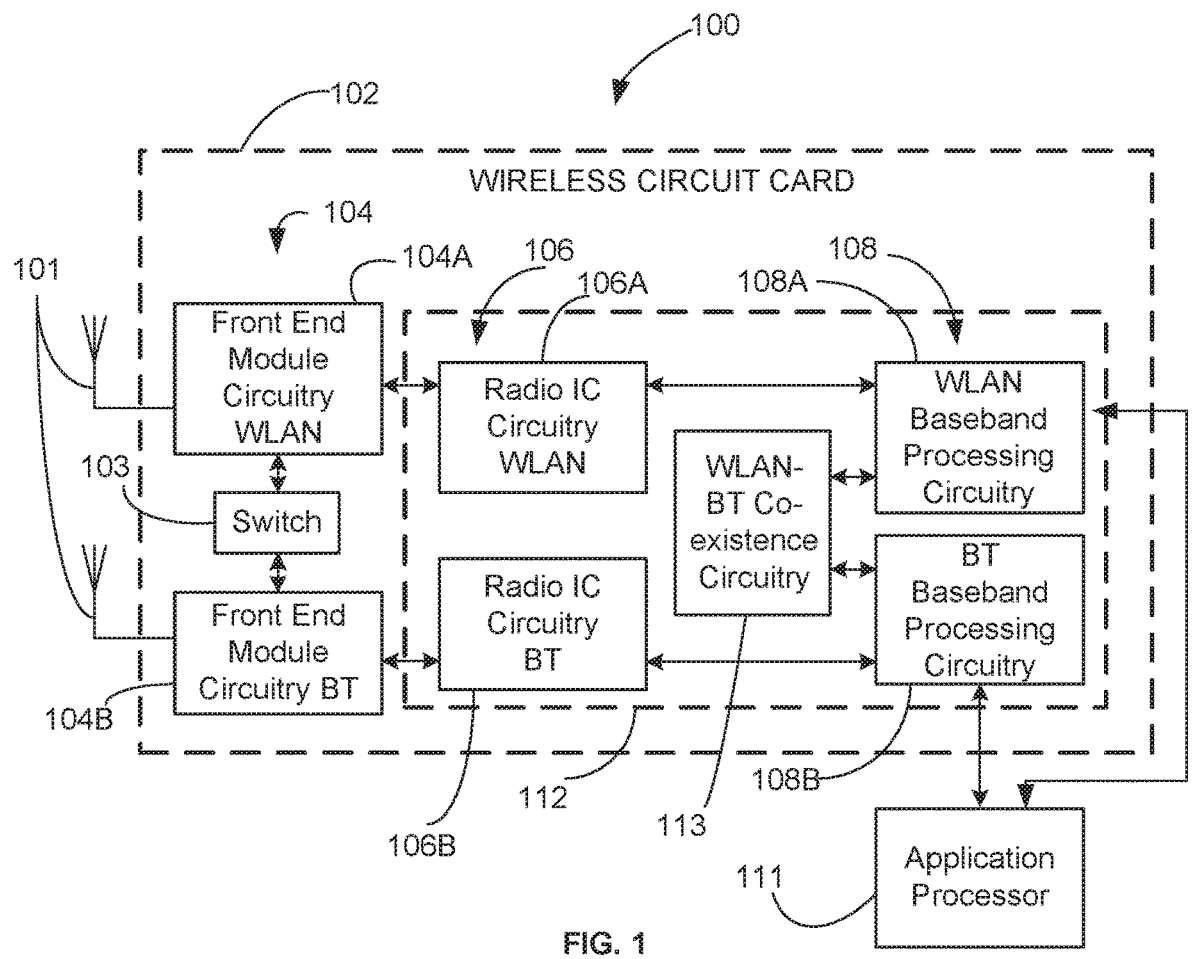
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
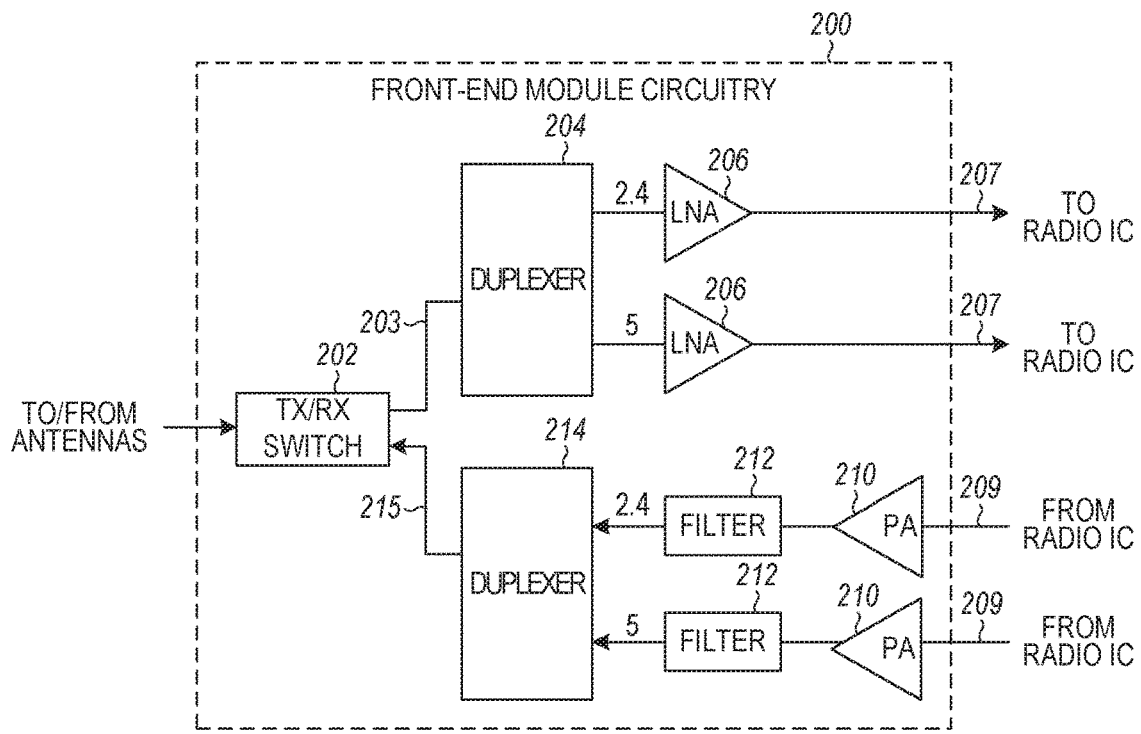
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
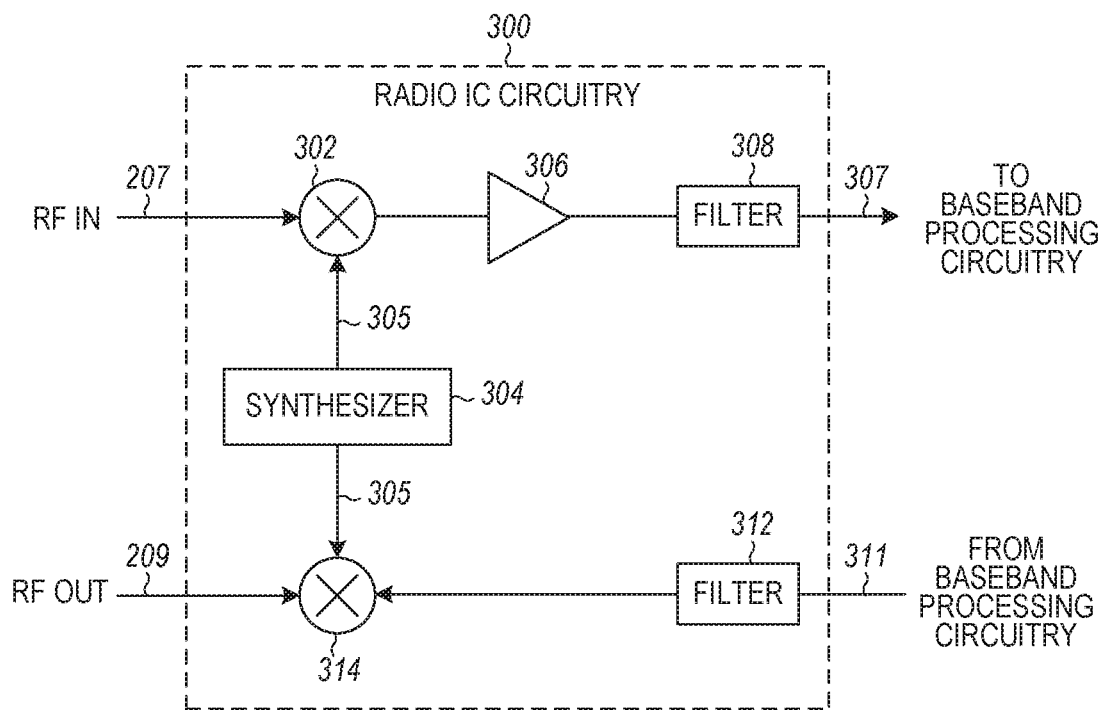
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
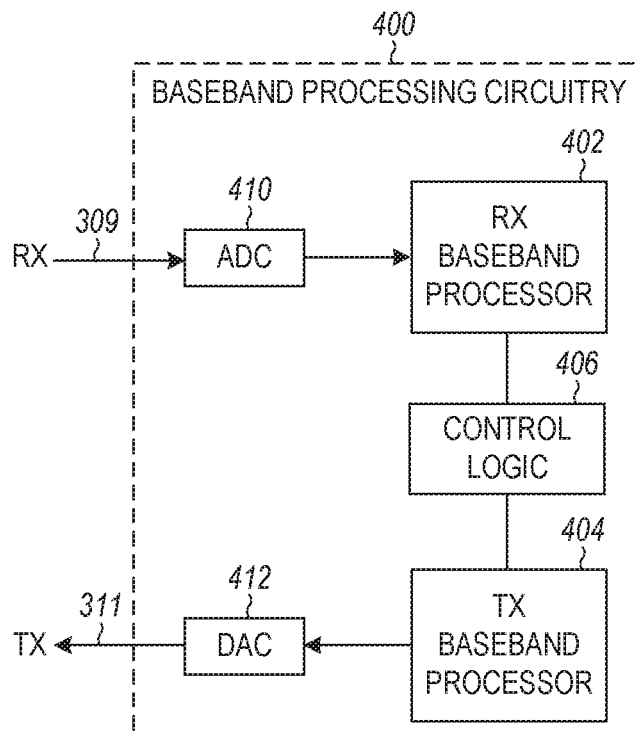
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
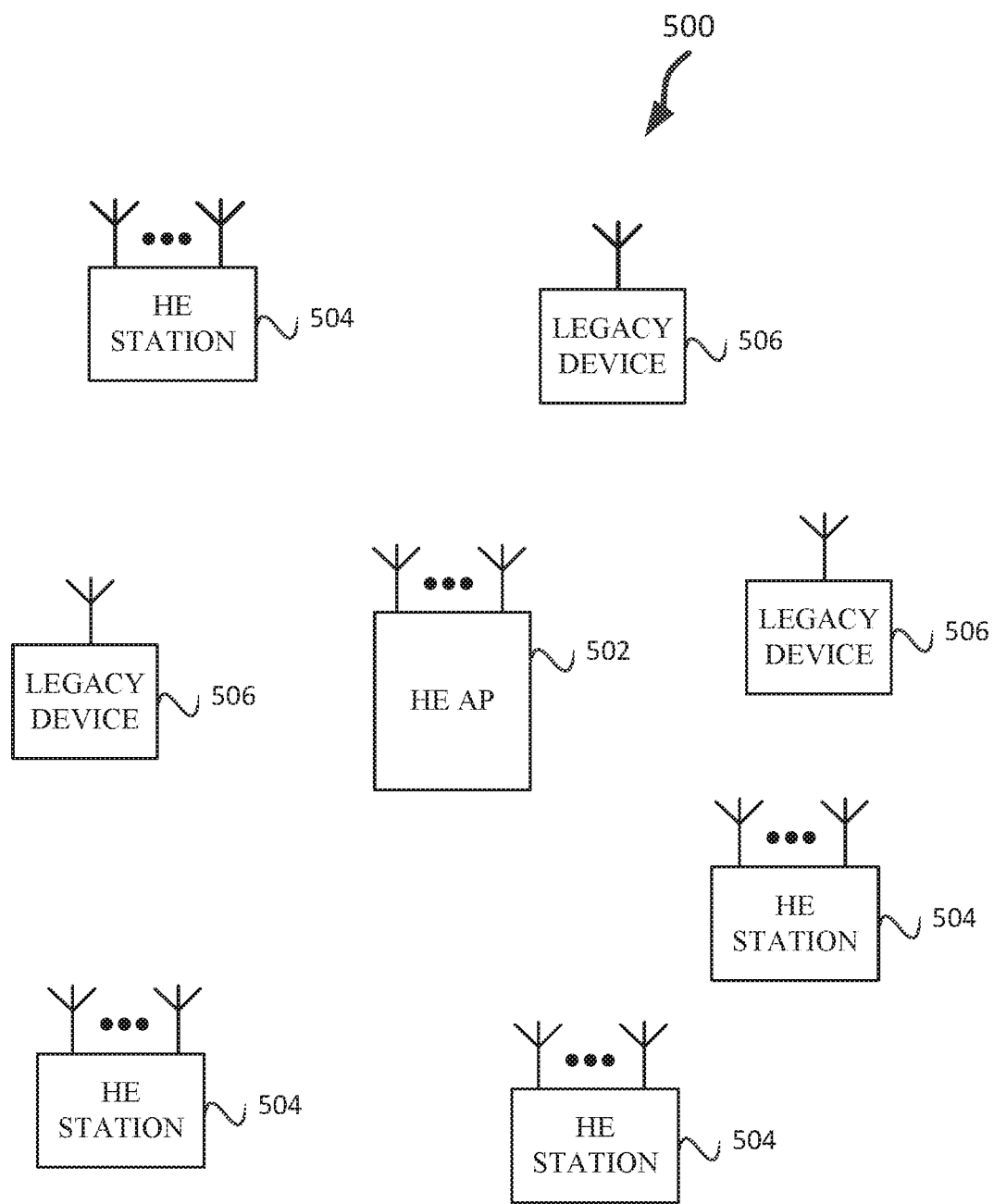
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of HE (e.g., IEEE 802.11ax) stations (STAs) 504, and a plurality of legacy (e.g., IEEE 802.11g/n/ac) devices 506. In some embodiments, the HE STAs 504 and/or HE AP 502 are configured to operate in accordance with IEEE 802.11 extremely high throughput (EHT). In some embodiments, the HE STAs 504 and/or HE AP 520 are configured to operate in accordance with IEEE 802.11az. In some embodiments, IEEE 802.11EHT may be termed Next Generation 802.11.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11 ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. HE AP 502 may be connected to the internet.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the HE AP 502 and HE STAs 504 are configured to operate in accordance with IEEE 802.11EHT, the legacy devices 506 may include devices that are configured to operate in accordance with IEEE 802.11ax. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the HE STAs 504 may be termed extremely high throughput (EHT) stations or stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax embodiments, a HE AP 502 may operate as a master station which may be arranged to contend for a wireless medium (e.g., during a contention period) to receive exclusive control of the medium for a transmission opportunity (TXOP). The HE AP 502 may transmit a EHT/HE trigger frame transmission, which may include a schedule for simultaneous UL transmissions from HE STAs 504. The HE AP 502 may transmit a time duration of the TXOP and sub-channel information. During the TXOP, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the HE AP 502 may communicate with HE stations 504 using one or more HE or EHT frames. During the TXOP, the HE STAs 504 may operate on a sub-channel smaller than the operating range of the HE AP 502. During the TXOP, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 or IEEE 802.11EHT/ax communication techniques, although this is not a requirement.

In some embodiments the HE station 504 may be a "group owner" (GO) for peer-to-peer modes of operation. A wireless device may be a HE station 502 or a HE AP 502.

In some embodiments, the HE STA 504 and/or HE AP 502 may be configured to operate in accordance with IEEE 802.11mc. In example embodiments, the radio architecture of FIG. 1 is configured to implement the HE STA 504 and/or the HE AP 502. In example embodiments, the front-end module circuitry of FIG. 2 is configured to implement the HE STA 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-19.

In example embodiments, the HE station 504 and/or the HE AP 502 are configured to perform the methods and operations/functions described herein in conjunction with FIGS. 1-19. In example embodiments, an apparatus of the EHT station 504 and/or an apparatus of the HE AP 502 are configured to perform the methods and functions described herein in conjunction with FIGS. 1-19. The term Wi-Fi may refer to one or more of the IEEE 802.11 communication standards. AP and STA may refer to EHT/HE access point 502 and/or EHT/HE station 504 as well as legacy devices 506.

In some embodiments, a HE AP STA may refer to a HE AP 502 and/or a HE STAs 504 that is operating as a HE APs 502. In some embodiments, when a HE STA 504 is not operating as a HE AP, it may be referred to as a HE non-AP STA or HE non-AP. In some embodiments, HE STA 504 may be referred to as either a HE AP STA or a HE non-AP.

Figure 6:
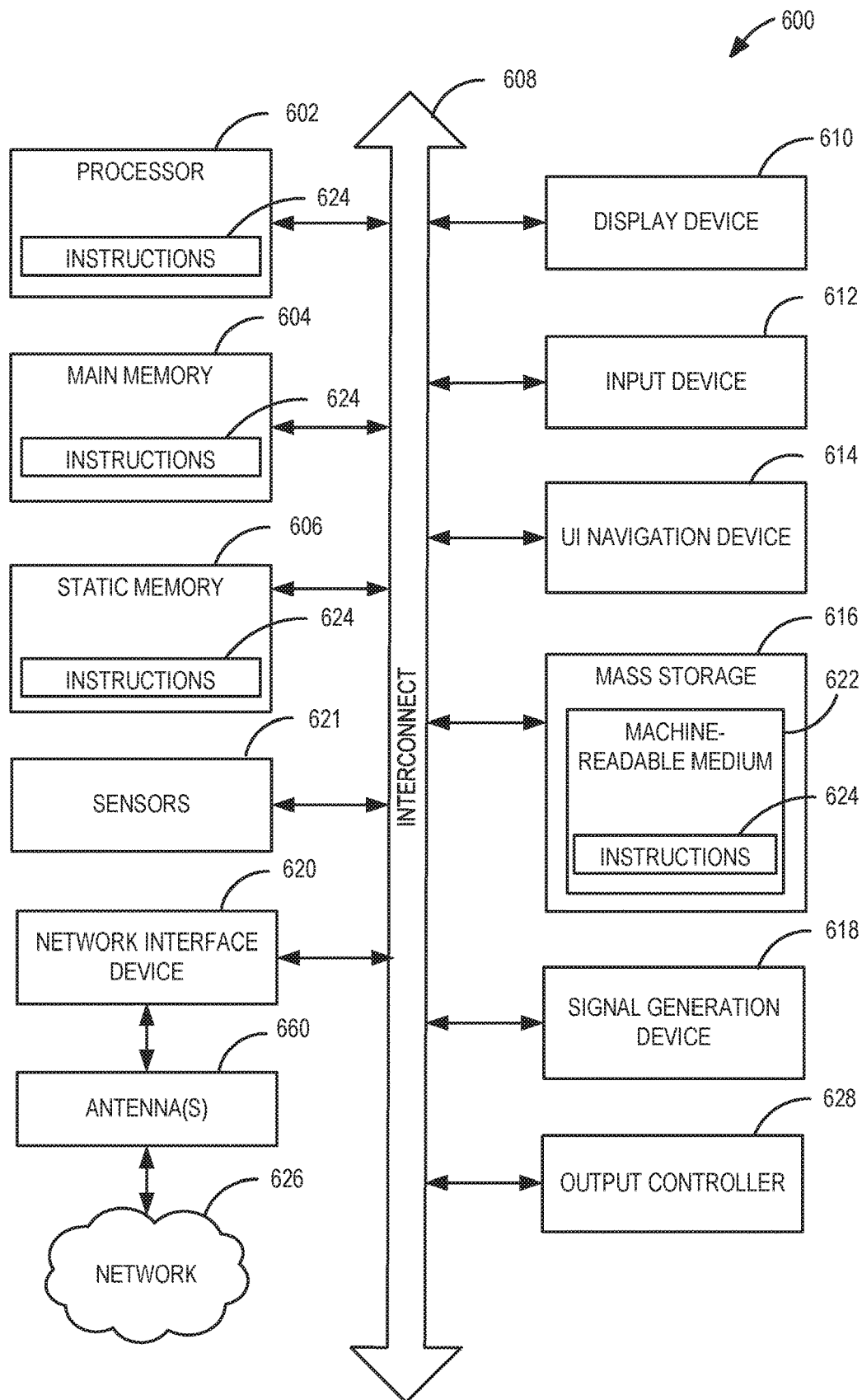
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
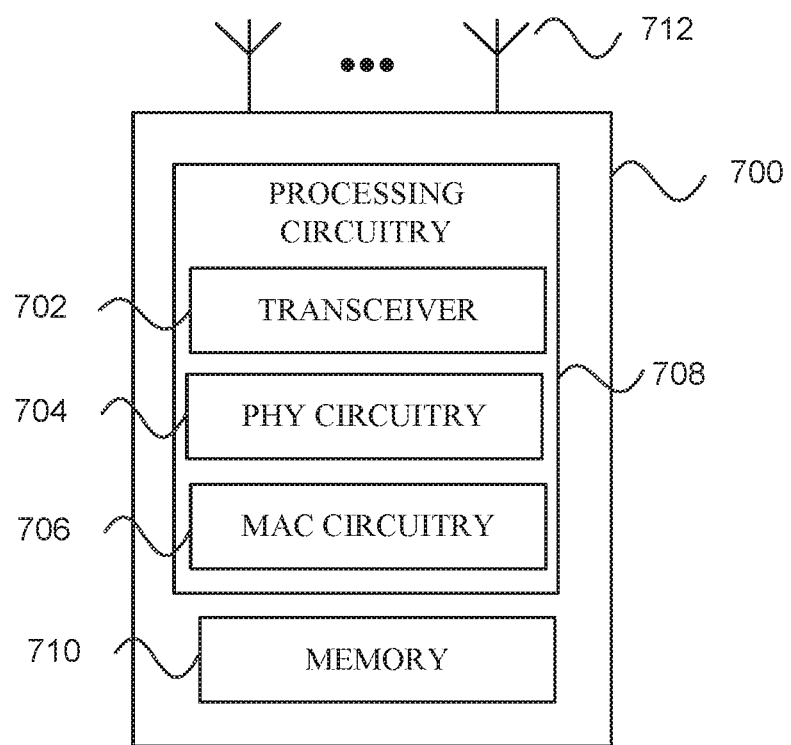
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
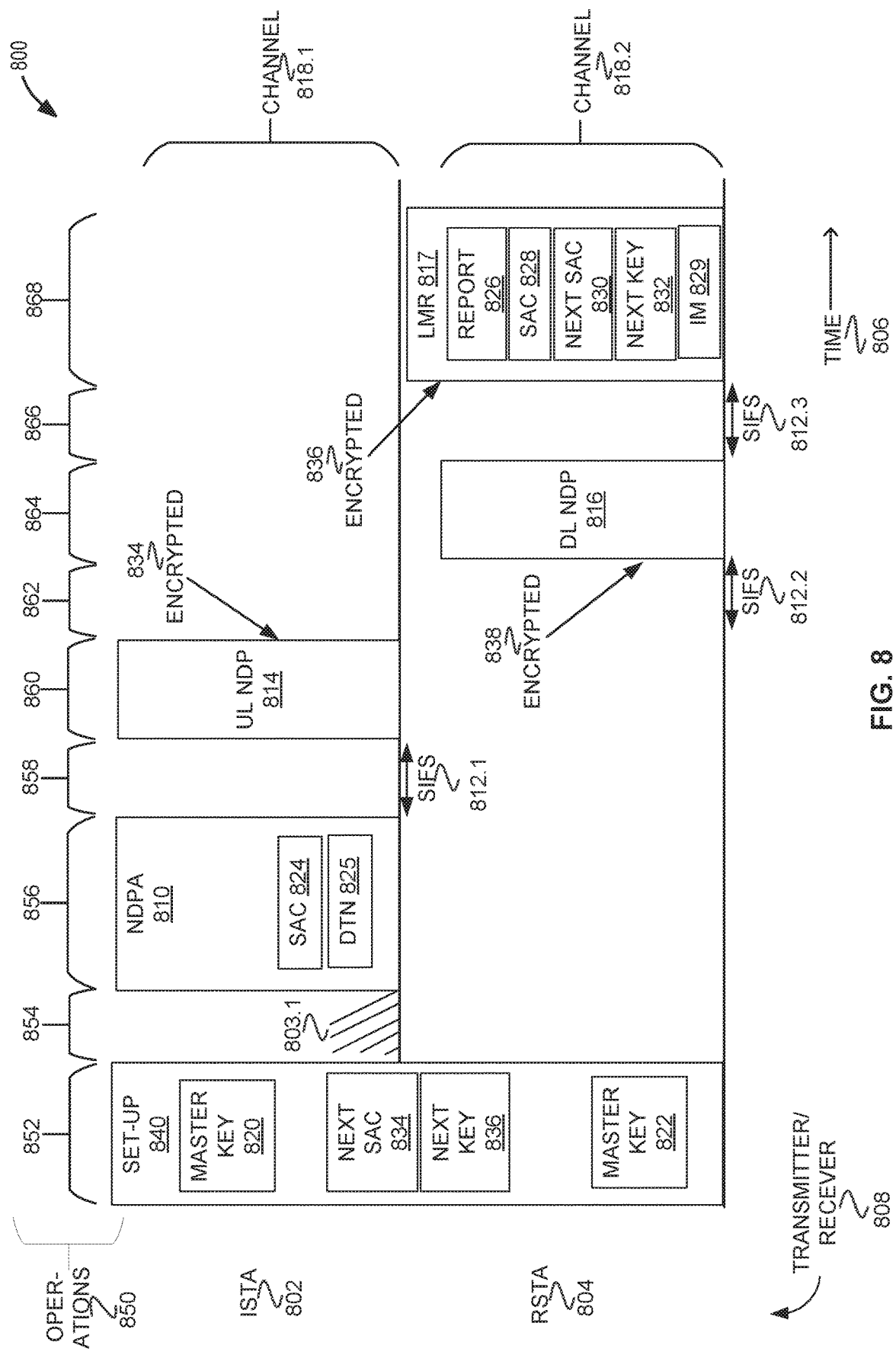
FIG. 8 illustrates a method for protection from counterfeit ranging, in accordance with some embodiments.
Figure 9:
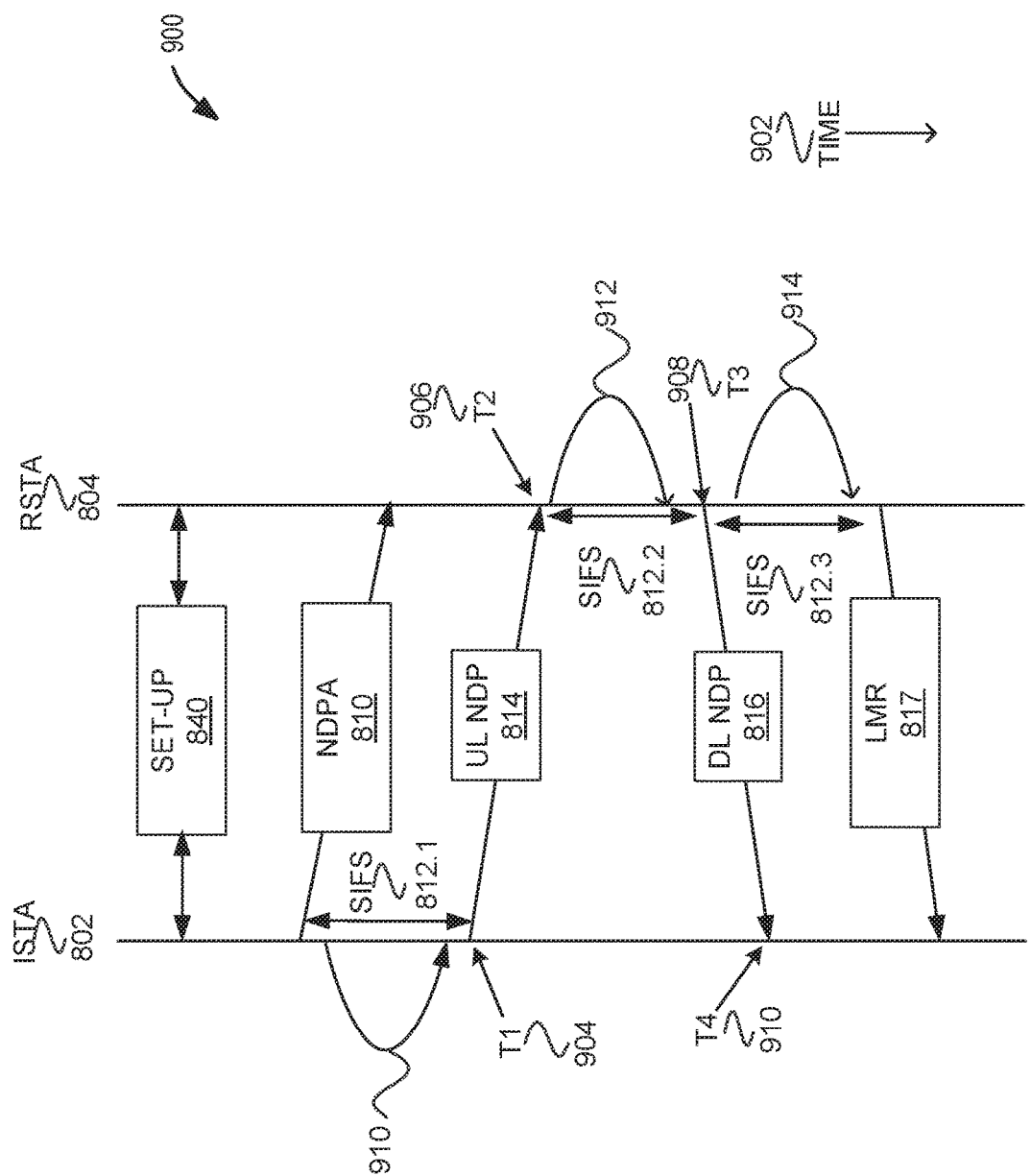
FIG. 9 illustrates a method for protection from counterfeit ranging, in accordance with some embodiments.

FIGS. 8-15 are disclosed in conjunction with one another. FIG. 8 illustrates a method 800 for protection from counterfeit ranging, in accordance with some embodiments. FIG. 9 illustrates a method 900 for protection from counterfeit ranging, in accordance with some embodiments. Illustrated in FIG. 8 is time 806 along a horizontal axis, transmitter/receiver 808, initiator STA (ISTA) 802, responder STA (RSTA) 804, channels 818, and operations 850 along the top. Illustrated in FIG. 9 is ISTA 802, RSTA 804, and time 902 along a vertical axis.

The ISTA 802 may be a HE STA 504 or HE AP 502 as described in conjunction with FIG. 5, e.g., ISTA and RSTA may be configured to operate in accordance with IEEE 802.11az. Channel 818.1 and channel 818.2 may be a sub-band, e.g., 20 MHz, of a bandwidth, e.g., 320 MHz, and may be a number of tones or subcarriers. Channel 818.1 and channel 818.2 may be the same channel. Channel 818.1 and channel 818.2 may partially overlap.

The method 800 begins at operation 852 with set-up 840. ISTA 802 and RSTA 804 may perform operations for fine time measurements (FTM). The set-up 840 may be a FTM negotiation. The ISTA 802 and RSTA 804 may derive a master key 820 for the ISTA 802 and a master key 822 for the RSTA 804. In some embodiments, the master key 820 and master key 822 are the same. The set-up 840 may include a pairwise transient key security association (PTKSA), which may be the result of 4-way handshake, FT 4-way handshake, fast basic service set (BSS) transition (FT) protocol, or FT resource request protocol, FILS authentication, pre-association security negotiation (PASN) authentication, or anther protocol. The master key 820 and 822 may be derived from the PTKSA. The master keys 820, 822 may have a limited lifetime. The master keys 820, 822 may be Pairwise Transient Keys (PTK) and/or Pairwise Master Keys (PMKs). In some embodiments, the master keys 820, 822 may be Group Transient Keys (GTKs). In some embodiments, the master keys 820, 822 may be more than one key each.

Figure 10:
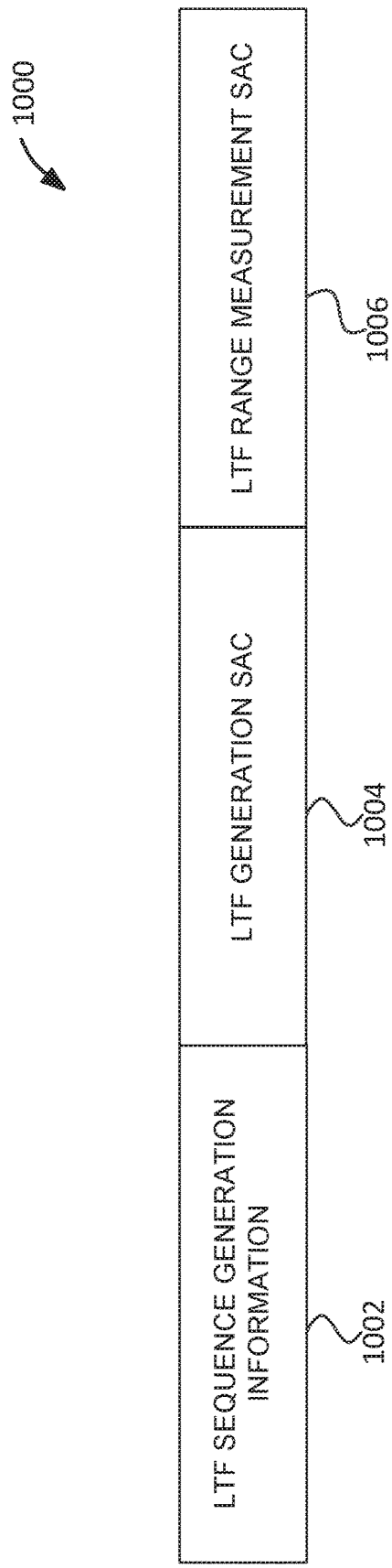
FIG. 10 illustrates a secure long-training field (LTF) parameter element, in accordance with some embodiments.

In some embodiments, the set-up 840 may include the exchange of secure LTF parameters element 1000 as disclosed in conjunction with FIG. 10. FIG. 10 illustrates a secure long-training field (LTF) parameter element 1000, in accordance with some embodiments. For example, the secure LTF parameters element 1000 may include LTF sequence generation information 1002, a LTF generation sequence authentication code (SAC) 1004, and a LTF range measurement SAC 1006. The LTF sequence generation information 1002 may include a temporary key or cipher and a number of antennas and a number of repetition soundings (e.g. for consistency check or range extension) and an expected bandwidth. The LTF generation SAC 1004 may be a SAC used to generate a current or next range measurement round. The LTF generation SAC 1004 may be associated with the LTF sequence generation information 1002 and may be a number that may identify the LTF generation SAC field 1004 for a next range measurement round (e.g., range measurement 1694 and reporting 1676). LTF range measurement SAC field 1006 may be a number that may identify the LTF sequence generation information 1002, in accordance with some embodiments. The LTF range measurement SAC field 1006 may identify the LTF sequence generation information of the current range measurement round or a previous range measurement round.

The method 800 may continue at operation 854 with the ISTA 802 contending for the wireless medium 803.1, e.g., channel 818.1. The method 800 continues at operation 856 with ISTA 802 transmitting a NDP announce (NDPA) frame 810. A duration field (e.g., 1504) of the NDPA frame 810 may indicate a TXOP duration that may include to the end of the transmission of LMR 817. The NDPA 810 frame may include a SAC field 824 and a dialog token field 825. The SAC field 824 may be termed a sounding dialogue token number, in accordance with some embodiments. The SAC field 824 may be a number that indicates a temporary key or cipher (e.g., LTF sequence generation information 1002) that will be used to determine the UL NDP 814, e.g., LTF sequence 1206. In some embodiments, dialog token number (DTN) field 825 may be 16 to 64 bits, e.g., 56 bits. The dialog token number field 825 may be incremented for different measurement phases. The dialog token number field 825 may be set or reset by the ISTA 802 and/or RSTA 804. The dialog token number field 825 may be a portion of the secure LTF parameters element 1000. The NDPA frame 810 may be addressed to RSTA 804, e.g., a RA field may include a media access control (MAC) address that addresses RSTA 804 and/or a STA Info field may include an AID field that addresses RSTA 804. The NDPA frame 810 may address other RSTAs 804 (not illustrated).

FIG. 9 illustrates the transmitting of set-up 840 and the transmitting of NDPA 810. The method 800 continues at operation 858 with waiting a short interframe space (SIFS) 812.1. FIG. 9 illustrates ISTA 802 waiting SIFS 812.1. The method 800 continues at operation 860 with transmitting uplink (UL) NDP 814.

Figure 11:
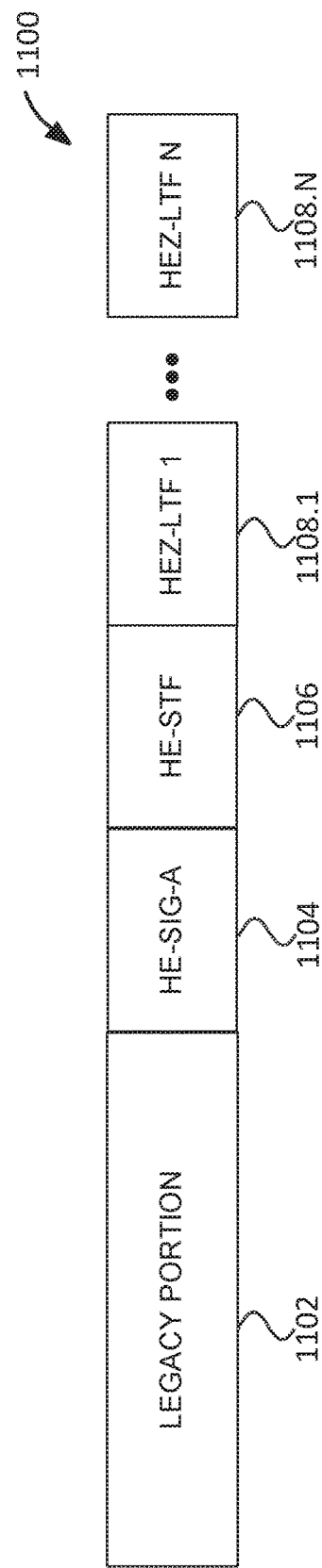
FIG. 11 illustrates a null data packet (NDP) in accordance with some embodiments.

FIG. 11 illustrates a null data packet (NDP) 1100 in accordance with some embodiments. Illustrated in FIG. 11 is legacy portion 1102, HE-signal (SIG)-A 1104, HE-short training field (STF) 1106, and HEz-LTF 1 1108.1 through HEz-LTF N 1108.N. HEz-LTF may be a LTF used in secure mode for IEEE 802.11az, in accordance with some embodiments. The legacy portion 1102 may include one or more legacy field. The HE-SIG-A 1104 may include information regarding decoding the NDP 1100. The HE-STF 1106 may be a short training field. The HEz-LTF 1108.1 through HEz-LTF 1108.N may be training fields that in secure mode are generated from a LTF sequence 1206, e.g., cyclically shifted time domain signal of a LTF sequence 1206 as disclosed in conjunction with FIG. 12. The HEz-LTF 1108 may comprise phase rotated 8 phase shift keying (8PSK) constellation points, in accordance with some embodiments. Each of the HEz-LTFs 1108 may be generated from different LTF sequences 1206. LTF generation SAC 1004 or LTF range measurement SAC 1006 may represent the values of SAC 834, SAC 824, SAC 828, or next SAC 830. LTF sequence generation information 1002 may represent the next key 836 or next key 832. The NDP 1100 may include one or more additional fields.

Figure 12:
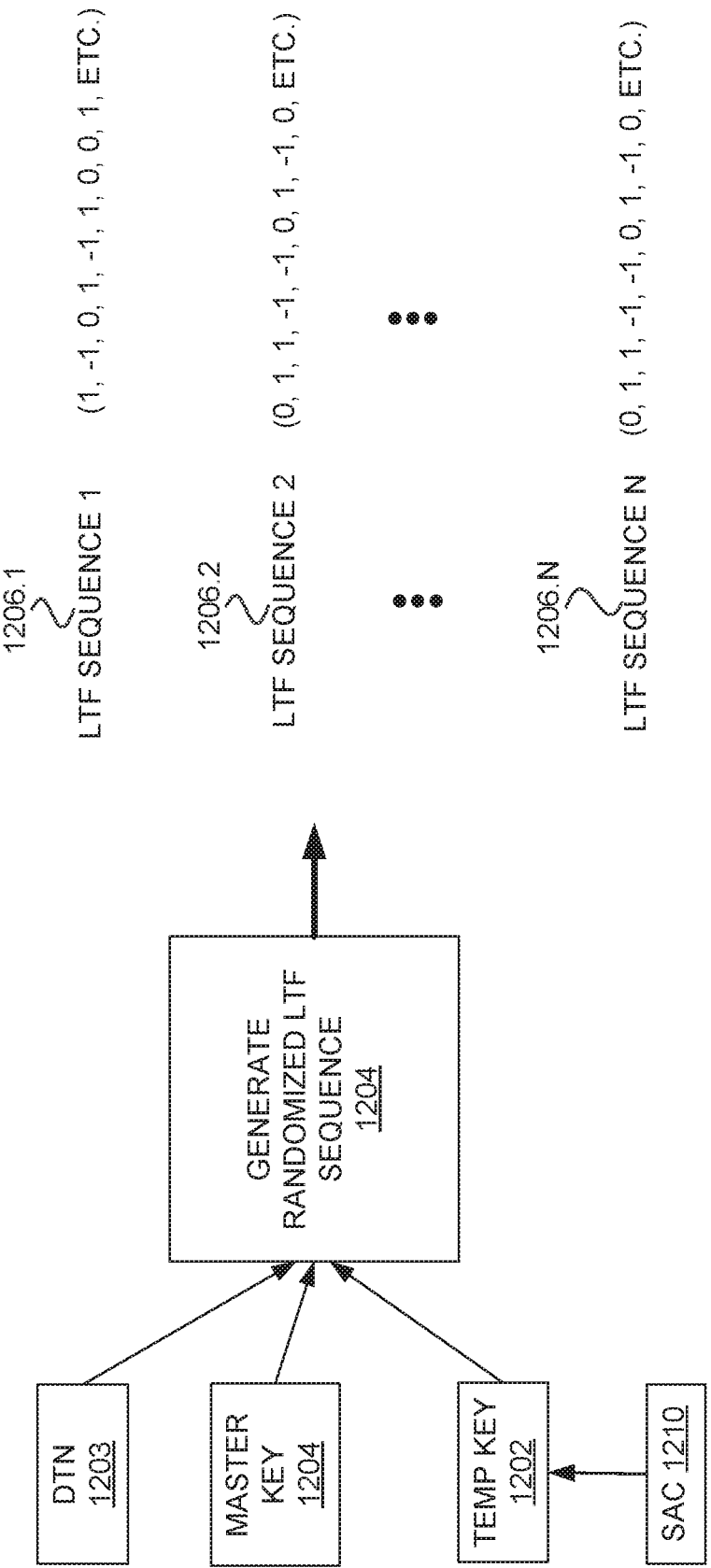
FIG. 12 illustrates generation of LTF sequence, in accordance with some embodiments.

FIG. 12 illustrates generation of LTF sequence 1206, in accordance with some embodiments. Illustrated in FIG. 12 is master key 1204, temp key 1202, SAC 1210, dialog token number (DTN) field 1203, generate randomized LTF sequence 1204, and LTF sequence 1 1206.1 through LTF sequence N 1206.N. The master key 1204 may be master key, e.g., 820, 822. The temp key 1202 may be a temporary key, e.g., LTF sequence generation information 1002 or next key 832. The DTN 1203 may be a number for a measurement round. In some embodiments, DTN 1203 may be a combination of the SAC 1210 and an indication of a number of a measurement round. The SAC 1210 may be SAC associated with the temp key 1202, e.g., next SAC 830 which is associated with next key 832. The generate randomized LTF sequence 1204 may generate LTF sequence 1 1206.1 through LTF sequence N 1206.N based on one or more of DTN 1203, master key 1204, temp key 1202, and SAC 1210. In some embodiments, different key or additional keys may be used to generate the LTF sequences 1206. The LTF sequences 1206 may be used to generate HEZ-LTF 1 1108.1 through HEZ-LTF N 1108.N. The LTF sequences 1206 may be 1's, 0's, or −1's. The HEz-LTF 1108 may be generated from the LTF sequences 1206, and the HEz-LTF 1108 may comprise phase rotated 8PSK constellation points, in accordance with some embodiments. The LTF sequences 1206 may be used to generate a waveform for the HEz-LTFs 1108 of the NDP 1100. The generation of the HEz-LTFs 1108 from the LTF sequences 1206 may result in phase rotated 8PSK constellation points, in accordance with some embodiments. Generate randomized LTF sequence 1204 may use temp key 1202 and master key 1204 to generate a cipher to generate the LTF sequences 1206, in accordance with some embodiments. In some embodiments, generate randomized LTF 1024 may use master key 1204 and temp key 1202 to generate LTF sequences 1206. In some embodiments, more than one master key 1204 and/or more than one temp key 1202 may be used to generate the LTF sequences 1206. The LTF sequences 1206 may be used to generate the HEz-LTFs 1108, where the HEz-LTFs 1108 are phase rotated 8PSK constellation points for each subcarrier (except, in some embodiments, DC or center subcarriers and edge subcarriers). The SAC 1210 may be a number that is associated with temp key 1202, e.g., SAC 1210 may identify temp key 1202.

Returning to FIGS. 8 and 9, the method 800 may continue at operation 858 with ISTA 802 waiting SIFS 812.1 before transmitting. The method 800 may continue at operation 860 with ISTA 802 transmitting UL NDP 814, which may be encrypted 834. At operation 910, ISTA 802 may encrypt UL NDP 814. For example, UL NDP 814 may be a NDP 1100. ISTA 802 may generate randomized LTF sequences 1206 as described in conjunction with FIG. 12.

The method 800 continues at operation 862 with RSTA 804 waiting a SIFS 812.2. The method 800 continues at operation 864 with the RSTA 804 optionally transmitting DL NDP 816. The RSTA 804 may authenticate or verify at operation 912 that the UL NDP 814 was generated with next key 836, which may be identified by next SAC 834. For example, RSTA 804 may use the method 1300 of FIG. 13 to authenticate UL NDP 814 at operation 912.

Figure 13:
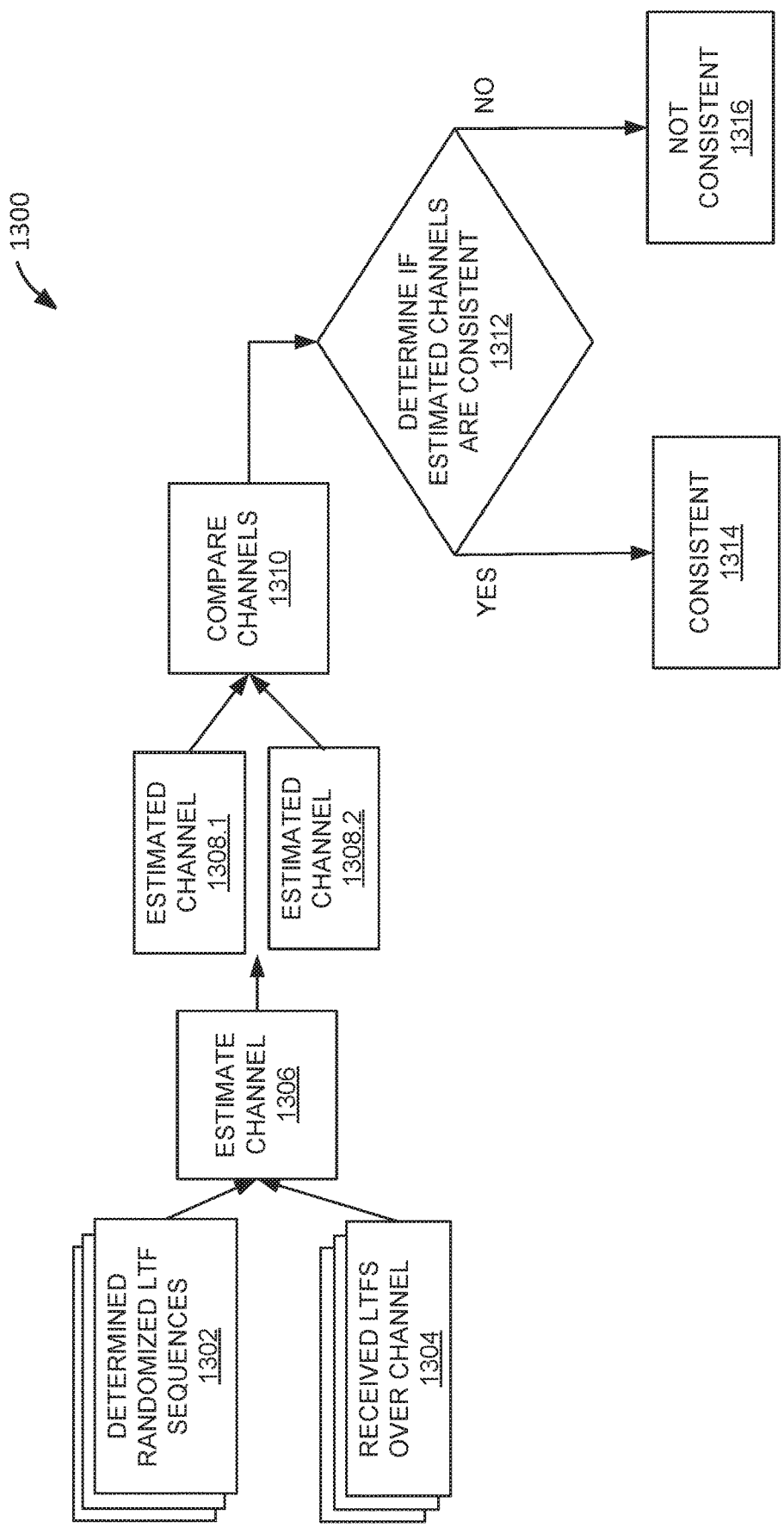
FIG. 13 illustrates a method of authenticating a NDP, in accordance with some embodiments.

FIG. 13 illustrates a method 1300 of authenticating a NDP, in accordance with some embodiments. Illustrated in FIG. 13 is determined randomized LTF randomized sequences 1302, received LTFS over channel 1304, estimate channel 1306, estimated channel 1308, compare channels 1310 (e.g., compare channels estimated from multiple soundings using different encrypted sounding signals within channel coherence time), and determine if estimated channels are consistent 1312.

The method 1300 begins with determine (determining) randomized LTF sequences 1302. For example, RSTA 804 (or 1604) may determine what the LTF sequences 1206 should be for UL NDP 814 (or UL NDP 1620) based on the master key 822, next key 836, DTN 825, and next SAC 834 as disclosed in conjunction with FIG. 12 (or one or more of auth 1670, 1672, 1674, 1677). Since during set-up 840 (1612), the ISTA 802 (1602) and RSTA 804 (104) established the master keys 820, 822, (1690) and established the first temporary key (e.g., next key 836, 1694) that should be used to generate UL NDP 814 (1622), the RSTA 804 (1604) may determine what the LTF sequences 1206 for UL NDP 814 should be. Additionally, the ISTA 802 may have transmitted the DTN 825, which may be used in the generation of the LTF sequences 1206, in accordance with some embodiments.

The determined randomized LTF sequences 1302 may determine what the HEz-LTFs 1108 generated from the LTF sequences 1206 should be based on one or more shared keys (e.g., as described in conjunction with FIG. 12). The HEz-LTFs 1108 that should have been transmitted may be phase rotated 8PSK constellation points, in accordance with some embodiments.

In a measurement round (e.g., operations 856 through 868) after the first, RSTA 804 may determine what the LTF sequences 1206 should be for UL NDP 814 based on one or more of the master key 822, next key 832, DTN 825, and next SAC 832. The method 1300 includes receiving LTFs over channel 1304. For example, RSTA 804 (1604) may receive the measured signals over one or more antennas 712.

The method 1300 may continue at estimating channel 1306. FIGS. 14 and 15 illustrate channel estimates, in accordance with some embodiments. Illustrated in FIG. 14 is time 1404, 1454 along a horizontal axis and the channel estimates along a vertical axis. The channel estimates 1402, 1452, 1502, 1552 may be channel taps 1406, 1456, 1506, 1556 that indicate the estimates of time-domain channel responses. Illustrated in FIG. 15 is time 1504, 1554 along a horizontal axis and the channel estimates along a vertical axis. The channel estimates 1402, 1452, 1502, 1504 may be complex numbers 1406, 1456, 1506, 1556 that indicate the estimates of the frequency-domain channel responses on one or more tones, subcarriers, or a sub-band of a bandwidth. FIGS. 14 and 15 illustrate channel estimates 1402, 1452, and 1502, 1552 from different NDPs. The channel estimates 1402, 1452 are from a same NDP, e.g., from two or more HEz-LTFs 1108. The channel estimates 1502, 1552 are from a same NDP, e.g., from two or more HEz-LTFs 1108. FIG. 14 illustrates channel estimates 1402, 1452 that when compared indicate the NDP (e.g., UL NDP 814) is consistent (e.g., authentic or likely authentic in that they were likely generated from the same LTF sequences 1206).

FIG. 15 illustrates channel estimates 1502, 1552 that when compared indicate the NDP (e.g., UL NDP 814) is inconsistent (e.g., counterfeit or likely counterfeit in that they were likely not generated from the same LTF sequences 1206). The estimated channel 1308.1, 1308.2, may be channel estimates 1402, 1452, or channel estimates 1502, and 1552. Estimate channel 1306 considers both the received LTFs over the channel 1304 and the determined randomized LTF sequence 1302 (e.g., phase rotated 8PSK constellation points that should have been generated and transmitted for the HEz-LTFs 1108) to determine the estimated channel 1308.1 and 1308.2. For example, if the LFT sequence 1206 determines a −1 is transmitted on a tone or sub-carrier and 0.0015 is received on the tone, then the presumption is that the channel response on the tone or sub-carrier is likely to be −0.0015. As another example, if the LTF sequence 1206 indicates a 1 (one) is transmitted on a tone or sub-carrier and 0.0015 is received, then it is assumed the channel response on the tone is likely to be 0.0015. Additionally, the phase of the received symbols of the HEz-LTFs 1108 may be compared with an anticipated phase based on the phase rotated 8PSK constellation points that should have been generated and transmitted for the HEz-LTFs 1108.

The channel estimates 1402, 1452, and channel estimates 1502, 1552 are taken from the same NDP (e.g., UL NDP 814), so channel coherence is assumed. That is since time to transmit between the HEZ-LTFs 1108 is only about 100 microseconds, the channel will very likely not change significantly between the transmissions of the HEZ-LTFs 1108.

The method 1300 may continue with compare estimated channels 1310. For example, compare channel estimate 1 1402 and channel estimate 2 1452. The channel estimates 1402, 1452, 1502, 1552 may be compared in magnitude and phase for each sub-carrier. The difference between the channel estimates 1402 and 1452 (or 1502 and 1552) may be summed (e.g., absolute values may be summed) to compare the two or more channel estimates 1402 and 1452 (and 1502 and 1552). There may be more than two channel estimates 1402, 1452, 1502, 1552, based on more than two HEz-LTFs 1108 (which may be generated based on different LTF sequences 1206). The channel estimates 1402, 1452 appear close to one another. Different measures for closeness may be determined, e.g., a difference in phase and magnitude (which may be normalized, e.g., absolute value taken) on each tone or sub-carrier divided by a total number of sub-carriers or tones. The RSTA 804 may then determine they are the consistent (e.g., same or different) based on whether the value is above (different) or below (same) a threshold. Channel estimate 1 1502 and channel estimate 2 1552 appear inconsistent or different. For example, subcarrier channel estimates 1506 and 1556 are of a different magnitude. Additionally, many of the other subcarrier channel estimates are of a different magnitude. The RSTA 804 may determine that the channel estimates are different. Additionally, in some embodiments the phases may be compared and a sum of the differences of the phases may be determined and compared separately or with the magnitude and a sum may be compared with a threshold to determine if the channel estimates 1502, 1552 are consistent or inconsistent (e.g., likely based on the LTF sequences 1206 or not.)

The method 1300 may continue with determine if estimated channels are consistent (e.g., determine whether LFT sequence were likely generated with proper keys.) Channel estimate 1 1402 and channel estimate 2 1452 indicate that the NDP was generated with the proper keys and then is consistent 1314 (or authenticated, e.g., UL NDP 814 was generated based on the correct keys, e.g., one or more of master key 822, DTN 825, and next key 836 were used to generate LTF sequences 1206 for the LTFs 1108 of the UL NDP 814. Channel estimate 1 1502 and channel estimate 2 1552 indicate that the NDP was generated not using the correct keys, e.g., master key 822, DTN 825, next key 836, and/or next key 832 was not used to generate LTF sequences 1206 for the LTFs 1108 of the UL NDP 814. Channel estimate 1 1502 and channel estimate 2 1552 may be determined to be not consistent 1316.

Returning to FIGS. 8 and 9, the RSTA 804 may have completed method 1300 and have determined whether UL NDP 814 is consistent or inconsistent (e.g., authentic or counterfeit.) RSTA 804 may determine whether UL NDP 814 is authentic or not because a counterfeit or rogue ISTA 802 may send rouge NDPAs 810 and/or UL NDPs 814 and use the DL NDP 816 return to try and determine the master key 822 and/or next key 836.

The RSTA 804 may if it is determined that UL NDP 814 is not consistent (e.g., counterfeit), not transmit DL NDP 816, transmit a fake DL NDP 816 (i.e., with the wrong keys), not transmit LMF 817, and/or transmit LMR 817 with an indication in the report 826 that there was a problem, which may include an indication that the UL NDP 814 may be inconsistent (e.g., counterfeit and/or wrong keys have been used to generate the UL NDP 814.) In some embodiments, the LMR 817 comprises an invalid measurement (IM) field 829, which indicates whether the UL NDP 814 is consistent or inconsistent. The RSTA 804 may generate and transmit the DL NDP 816. For example, the RSTA 804 may use one or more of master key 822, DTN 825, and next key 836 to generate randomized LTF sequences 1204 of DL NDP 816 (e.g., HEZ-LTFs 1108).

The method 800 may continue at operation 866 with the RSTA 804 waiting a SIFS 812.3 before transmitting the LMR 817. The RSTA 804 at operation 914 (e.g., during the SIFS 812.3) may prepare LMR 817. The LMR 817 may include a report 826, which include times T2 906 and T3 908. ISTA 802 will then have T1 904, T2 906, T3 908, and T4 910. ISTA 802 may then determine a Round Trip Time (RTT) in accordance with equation (1): $RTT=[(T4-T1)-(T3-T2)]$. The RTT may be used to determine a distance between RSTA 804 and ISTA 802. The LMR 817 may include a channel state information (CSI) element. In accordance with some embodiments, the ISTA 802 does not acknowledge the receipt of the LMR 817.

The report 826 may include an indication that UL NDP 814 is inconsistent (e.g., likely counterfeit or the measurement under report is invalid), or that the UL NDP 814 is not invalid. For example, LMR 817 may include IM field 829 which may indicate whether the measurement report is invalid or not invalid. The IM field 829 may be part of the report 826. The SAC 828 may identify the temporary key (e.g., next key 836) that was used to generate DL NDP 816. The next SAC 830 and next key 832 may be for a next measurement round. The LMR 817 may be encrypted using one or more of the master key 822, DTN 825, and the next key 836. Additionally, one or more other keys may be used to generate the LTF sequences 1206. In some embodiments, RSTA 804 will encrypt LMR 817 in accordance with Protected Management Frames in accordance with IEEE 802.11w.

The RSTA 804 will generate next key 832 and next SAC 830. In some embodiments, if the UL NDP 814 was received in error (or determined to be counterfeit) and/or the DL NDP 816 was transmitted in error, the LMR 817 may indicate that an error occurred, e.g., by setting a value of the time of arrival (TOA) field to zero, a value of a TOA Error field to a maximum value, or a value of IM field 829 to one or zero. In some embodiments, the RSTA 804 may have transmitted the LMR 817 because a LMR type of reporting may have been set to immediate, e.g., immediate/delayed which may have been set to immediate during set-up 840.

In some embodiments, the ISTA 802 may transmit a LMR to the RSTA 804 a SIFS 812 after receiving the LMR 817. The ISA 802 may generate the LMR 817 to include a report (e.g., times T1 and T4 910). The LMR from the ISA 802 may include the SAC 828 as well. The LMR may be encrypted in a same or similar way as LMR 817. In some embodiments, operations 856 through 868 may be repeated one or more times.

Figure 16:
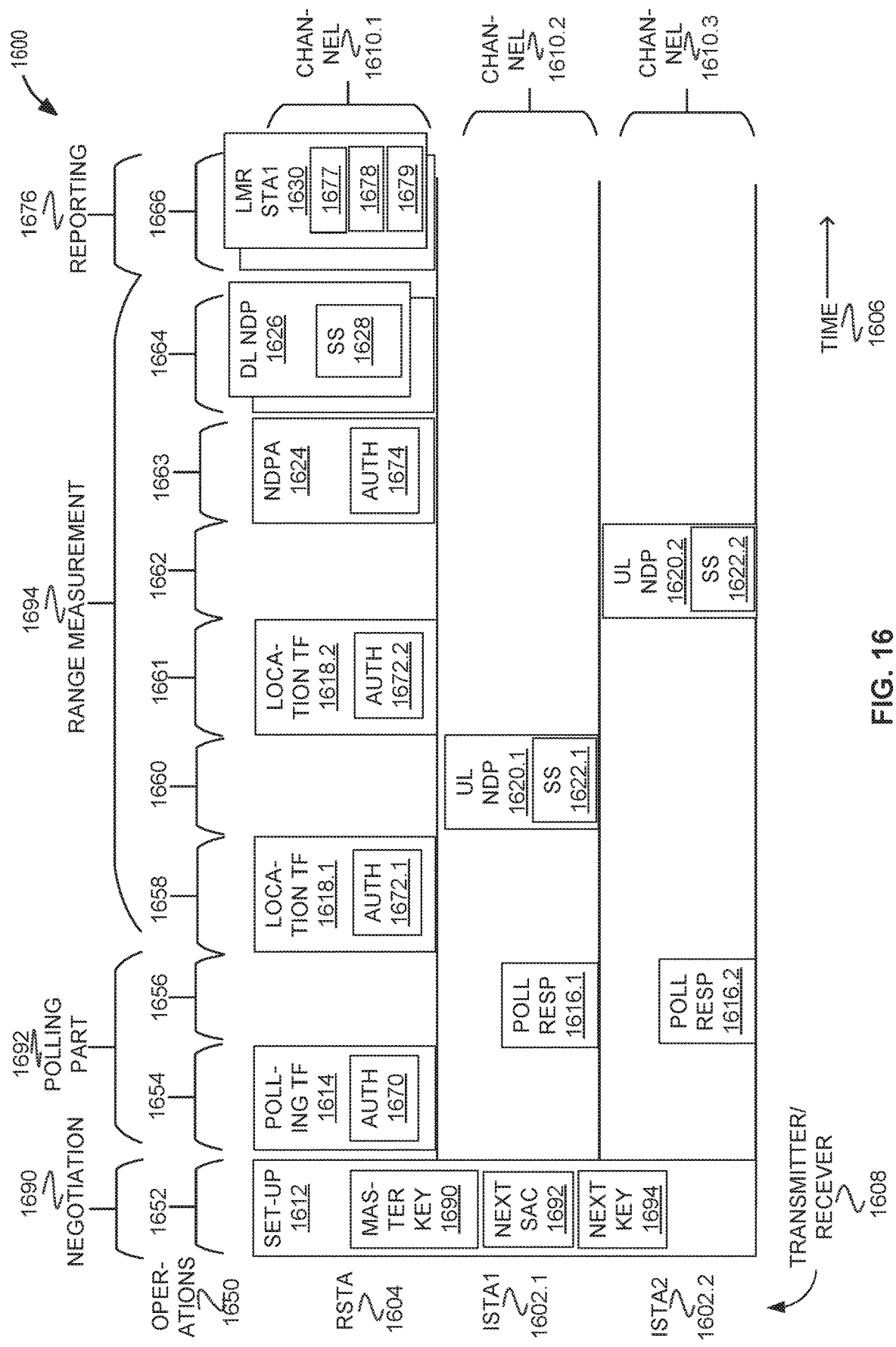
FIG. 16 illustrates a method for protection from counterfeit ranging for multiple users, in accordance with some embodiments.
Figure 17:
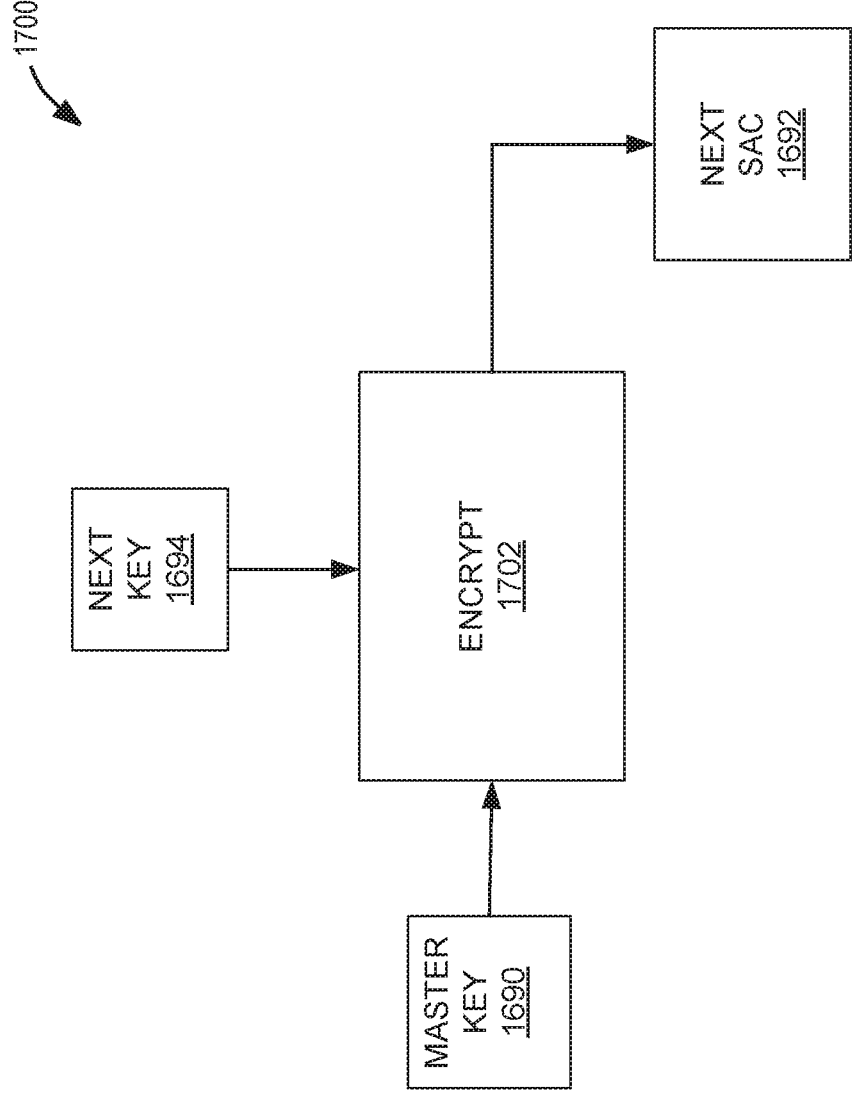
FIG. 17 illustrates generating an authentication code, in accordance with some embodiments.

FIGS. 16 and 17 are disclosed in conjunction with one another. FIG. 16 illustrates a method 1600 for protection from counterfeit ranging for multiple users, in accordance with some embodiments. Illustrated in FIG. 16 is time 1606 along a horizontal axis, transmitter/receiver 1608, ISTA1 1602.1, ISTA2 1602.2, RSTA 1604, channels 1610, and operations 1650 along the top. The method 1600 may be divided into negotiation 1690, polling part 1692, range measurement 1694, and reporting 1696. In some embodiments, reporting 1696 may be consider a portion of range measurement 1694.

The ISTAs 1602 may be a HE STA 504 or HE AP 502 as described in conjunction with FIG. 5, e.g., ISTA and RSTA may be configured to operate in accordance with IEEE 802.11az. Channel 810.1, channel 810.2, and channel 818.3 may be a sub-band, e.g., 20 MHz, of a bandwidth, e.g., 320 MHz, and may be a number of tones or subcarriers. Channel 810.1, channel 810.2, and channel 810.3 may be the same channel. Channel 818.1, channel 818.2, and channel 818.3 may partially overlap.

The method 1600 begins at operation 1652 with set-up 1612. ISTAs 1602 and RSTA 1604 may perform operations for FTM. The set-up 1612 may include a FTM negotiation. The ISTAs 1602 and RSTA 1604 may derive a master key 820. In some embodiments, the master key 20 is the same for the RSTA 1604, ISTA1 1602.1, and ISTA2 1602.2. In some embodiments, RSTA 1604 and ISTAs 1602 derive separate master keys. The master key 1690 may be derived based on a PTKSA, which may be the result of 4-way handshake, FT 4-way handshake, BSS FT protocol, FT resource request protocol, FILS authentication, PASN authentication, or anther protocol. The master key 1690 may be derived from the PTKSA. The master key 1690 may have a limited lifetime. The master key 1690 may be a PTK and/or PMKs. In some embodiments, the master keys 1690 may be GTKs. In some embodiments, the master key 1690 may be more than one key, e.g., a transient key and a less transient key.

In some embodiments, the set-up 1612 may include the exchange of secure LTF parameters element 1000 as disclosed in conjunction with FIG. 10. FIG. 10 illustrates a secure LTF parameter element 1000.

For example, the secure LTF parameters element 1000 may include LTF sequence generation information 1002, a LTF generation SAC 1004, and a LTF range measurement SAC 1006. The LTF sequence generation information 1002 may include a temporary key or cipher and a number of antennas and a number of repetition soundings (e.g. for consistency check or range extension) and expected bandwidth. The LTF generation SAC 1004 may be a SAC used to generate a current or next FTM round (e.g., range measurement 1674). The LTF generation SAC 1006 may be associated with the LTF sequence generation information 1002 and may be a number that may identify the LTF generation SAC field 1004 for a next measurement round. The range measurement SAC field 1006 may be a number that may identify the LTF sequence generation information 1002 or may identify the LTF sequence generation information of the current of a previous range measurement round. The next SAC 1692 may be the same or similar as LTF generation SAC 1004. The next key 1694 may be a temporary key that may be used for the generation of the LTF sequences 1206 for the UL NDPs 1620 and DL NDPs 1626. The next SAC 1692 may be a number that identifies the next key 1694. The next key 1694 may be derived based on the master key 1690, in accordance with some embodiments. There may be more than two ISTAs 1602.

The method 1600 continues at operation 1654 with RSTA 1604 transmitting polling trigger frame (TF) 1614. The RSTA 1604 may wait a SIFS after operation 1652 before transmitting the polling TF 1614 or may wait a longer duration. The polling TF 1614 may poll one or more of the ISTAs 1602 to determine which ISTAs 1602 would like to perform a ranging measurement 1694. The polling TF 1614 may include authentication (auth) 1670. In some embodiments, RSTA 1604 will encrypt polling TF 1614 in accordance with Protected Management Frames in accordance with IEEE 802.11w.

In some embodiments, the auth 1670 may be a message integrity code (MIC) or message authentication code (MAC). In some embodiments, the auth 1670 may be a measurement token or an index for random seed (e.g, IV or PN), which may have been previously sent to the ISTAs 1602 encrypted. In some embodiments, the auth 1670 may be a random number, e.g., a random token generated from a key shared by the RSTA 1604 and ISTAs 1602 (e.g., the master key 1690). In some embodiments, the auth 1672, 1674, and/or 1677 may be a message integrity code (MIC) or message authentication code (MAC). In some embodiments, the auth 1672, 1674, and/or 1677 may be a measurement token or an index for random seed (e.g, IV or PN), which may have been previously sent to the ISTAs 1602 encrypted. In some embodiments, the auth 1672, 1674, and/or 1677 may be a random number, e.g., a random token generated from a key shared by the RSTA 1604 and ISTAs 1602 (e.g., the master key 1690). In some embodiments, auth 1672, 1674, and/or 1676 may be a SAC e.g. next SAC 1692 generated by the master key 1690 and other parameters. In some embodiments, the auth 1672 may be a SAC (e.g., next SAC 1692). In some embodiments, the SAC is a number that indicates the temp key 1202 to use. The SAC may be generated using the master key 1204, temp key 1202, and/or another key or additional keys (or determined during negotiation 1690). The ISTAs 1602 may generate what the SAC (e.g., auth 1672, 1674, 1677) should be to authenticate the location TFs 1618. For example, ISTAs 1602 may use the procedure described in conjunction with FIG. 12 or FIG. 17 to determine what the SAC should be and then compare the received SAC (e.g., auth 1672, 1674, 1677) with what the SAC should be.

FIG. 17 illustrates generating an authentication code, in accordance with some embodiments. Illustrated in FIG. 17 is master key 1690, next key 1694, encrypt 1702, and next SAC 1692. The RSTA 1604 may use encrypt 1702 to generate next SAC 1692. For example, encrypt 1702 may use next key 1694 and master key 1690 to generate a cypher (e.g., as input to a random number generator) to generate the next SAC 1692. In some embodiments, encrypt 1702 may use different or additional keys to generate next SAC 1692. The next SAC 1692 may be used as an identifier for the next key 1694. In some embodiments, the encryption of the next key 1694 may be truncated or another arithmetic action performed to reduce the size of the next SAC 1692, e.g., so the field to represent the next SAC 1692 may be smaller. In some embodiments, the encrypt 1702 may be similar to or the same as generate randomized LTF sequence 1204 and some of the output bits 1206 e.g. 16 bits may be used as SAC.

The method 1600 continues at operation 1656 with the ISTAs 1602 transmitting poll responses 1616. In some embodiments, the ISTAs 1602 will first check the validity of auth 1670 (when auth 1670 is included in the polling TF 1614). And if the authentication fails (e.g., if the ISTAs 1602 determine that auth 1670 is not valid), then ISTAs 1602 will not transmit the poll response 1616, in accordance with some embodiments.

The ISTAs 1602 may check to see if the auth 1670 is valid. For example, if auth 1670 is next SAC 1692, then ISTAs 1602 may use the master key 1690 and next key 1694 as input parameters (or input bit stream) encrypt 1702, (as illustrated in FIG. 17) and see if the output result e.g. part of the generated encryption bits is equivalent to next SAC 1692 as disclosed in conjunction with FIG. 17.

The method 1600 may continue at operations 1658 and 1661 with the RSTA 1604 transmitting location TF 1618.1. The RSTA 1604 may determine which ISTAs 1602 responded to the polling TF 1614 and transmit a location TF 1618 to each of them. Location TF 1618 may include auth 1672, which may be the same or similar to auth 1670. In some embodiments, a single location TF 1618 may include multiple resource units for multiple ISTAs. For example, the location TF 1618 may include spatial stream (SS) resource allocations for the ISTAs 1602 so that they may transmit simultaneously. In some embodiments, as illustrated, the ISTAs 1602 will transmit sequentially which may be triggered by one or more location TFs 1618. In some embodiments, RSTA 1604 will encrypt location TF 1618 in accordance with Protected Management Frames in accordance with IEEE 802.11w. The location TFs 1618 may include other information such as indication of the ISTAs 1602, resource allocation for the UL NDPs 1620, resource allocations for the DL NDP 1626, etc.

The method 1600 continues at operations 1660 and 1662 with the ISTAs 1602 transmitting UL NDPs 1620 in accordance with SS 1622. The ISTAs 1602 may check the validity of auth 1672 and not transmit if the auth 1672 is not found to be valid. The UL NDP 1620 may be generated based on using next key 1694 associated with next SAC 1692 to generate the LTF sequences 1206 of the UL NDP 1620 as disclosed in conjunction with FIG. 12.

The method 1600 continues at operation 1663 with RSTA 1604 transmitting NDPA 1624. The NDPA 1624 may include auth 1674, which may be the same or similar to auth 1670 or auth 1672. The ISTAs 1602 may check the validity of auth 1674. The ISTAs 1602 may not use the results of LMR STA1 1630 or process DL NDP 1626 if the auth 1672 or auth 1674 is not found to be valid. The method 1600 continues at operation 1664 with RSTA 1604 transmitting DL NDP 1626 in accordance with the SS 1628. In some embodiments, a single DL NDP 1626 is transmitted on the channel 1610 to the different ISTAs 1602. Each HEz-LTF 1108 is generated with a different key for a corresponding ISTA 1602. The HEz-LTFs 1108 of the different ISTAs 1602 may be sequentially concatenated, which may include spatial multiplexing. The DL NDP 1626 may be generated using the next SAC 1692 (or a different key or additional keys) corresponding to the ISTA 1602 (e.g., the ISTAs 1602 may have different next SACs 1692 and next keys 1694) to generate the LTF sequences 1206 that are used to generate the HEz-LTFs 1108 of the DL NDP 1626 as disclosed in conjunction with FIG. 12.

The method continues at operation 1666 with the RSTA 1604 transmitting LMR STA1 1630. RSTA 1604 may transmit one LMR for each ISTA 1602. The LMR STA1 1630 may be transmitted on a SS or an OFDMA resource unit in accordance with a schedule that may be part of the LMR STA1 1630. The LMR STA1 1630 may include auth 1677, next SAC 1678, and next key 1679, where auth 1677 may be the same or similar as auth 1670 or auth 1672. The ISTAs 1602 may check the validity of auth 1677. The ISTAs 1602 may determine not to use the results of LMR STA1 1630 or process DL NDP 1626 if the auth 1672 is not found to be valid. In some embodiments, the LMR STA1 1630 comprises an invalid measurement (IM) field (not illustrated), which indicates whether the UL NDP 1620 of the corresponding ISTA 1602 is consistent or inconsistent.

The method 1600 may optionally include the ISTAs 1602 transmit LMRs to the RSTA. The auth 1672 or auth 1670 may protect the ISTAs 1602 from transmitting the UL NDP 1620, which may provide information that may help a RSTA 1604 transmitting a counterfeit location TF 1618 determine a master key 1690 or next SAC 1692.

The time between the operation of method 1600 may be a SIFS. The time between 1652 and 1654 may be longer than a SIFS and there may be one or more operations between 1652 and 1654 that are not illustrated. Method 1600 may include one or more additional operation. The operations of method 1600 may be performed in a different order. In some embodiments, one or more operations of method 1600 may be optional.

In some embodiments, of FIG. 16, the ISTAs 1602 may be configured to determine whether a SAC included in the auth 1672 was derived from the next key 1694 as described in conjunction with FIG. 17. The SAC included in the auth 1672 should be the next SAC 1692, in accordance with some embodiments. In some embodiments, if the ISTAs 1602 determine the SAC included in the auth 1672 was not derived from the next key 1694, then the ISTAs 1602 may not transmit the UL NDPs.

Figure 18:
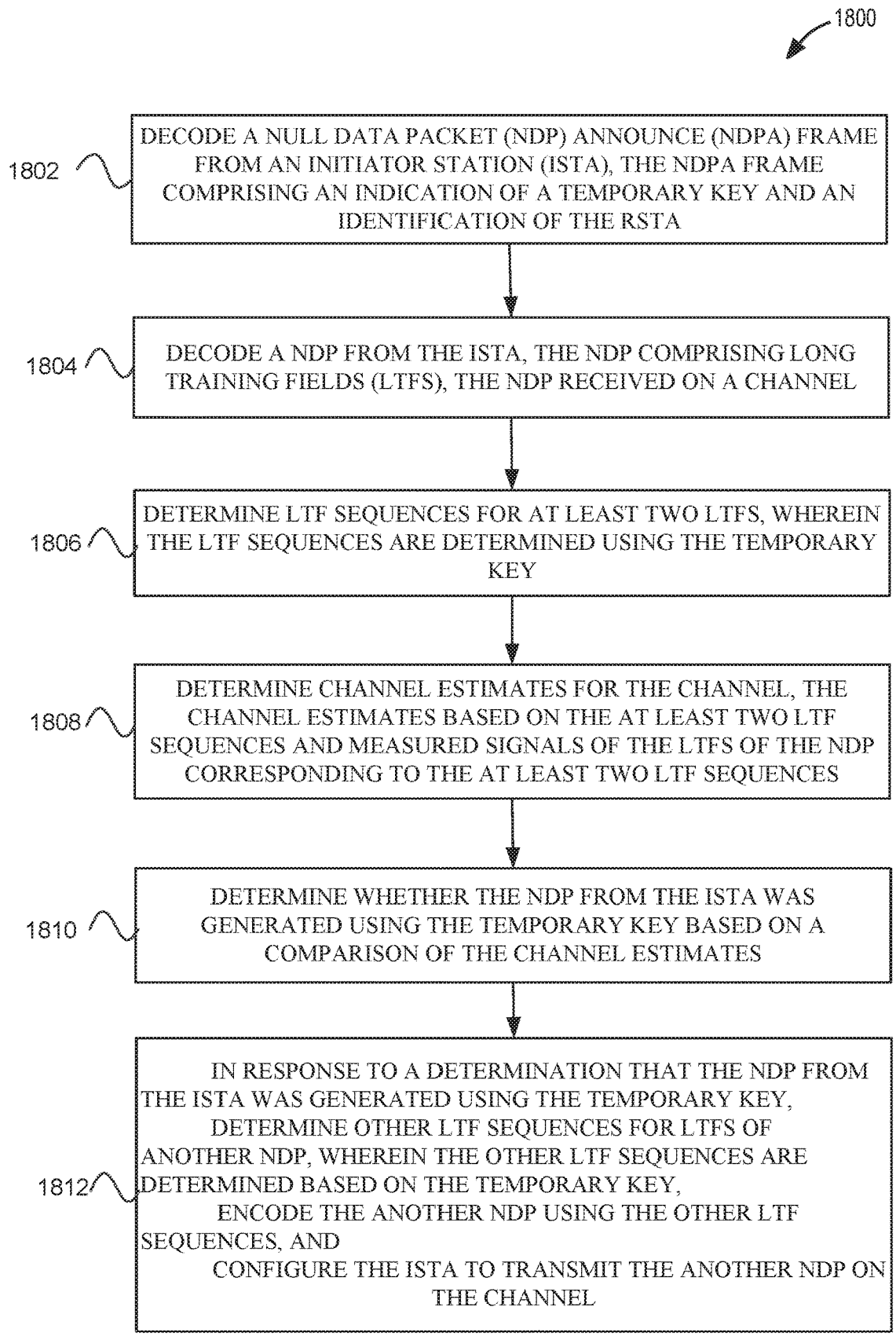
FIG. 18 illustrates a method for protection from counterfeit ranging, in accordance with some embodiments.

FIG. 18 illustrates a method 1800 for protection from counterfeit ranging, in accordance with some embodiments. The method 1800 may begin at operation 1802 with decoding a NDPA frame from an ISTA, the NDPA frame including an indication of a temporary key and an identification of the RSTA. For example, RSTA 804 may decode NDPA 810 that include SAC 824.

The method 1800 may continue at operation 1804 with decoding a NDP from the ISTA, the NDP comprising LTFs, the NDP received on a channel. For example, RSTA 804 may decode UL NDP 814 from ISTA 802 on channel 818.

The method 1800 may continue at operation 1806 with determining LTF sequences for at least two LTFs, wherein the LTF sequences are determined using the temporary key. For example, RSTA 804 may determine randomized LTF sequences 1302.

The method 1800 may continue at operation 1808 with determining channel estimates for the channel, the channel estimates based on the at least two LTF sequences and measured signals of the LTFs of the NDP corresponding to the at least two LTF sequences. For example, RSTA 804 may determine estimated channel 1308.1 and estimated channel 1308.2.

The method 1800 may continue at operation 1810 with determining whether the NDP from the ISTA was generated using the temporary key based on a comparison of the channel estimates. For example, RSTA 804 may determine whether LTF sequences were generated with proper keys 1312.

The method 1800 may continue at operation 1812 with in response to a determination that the NDP from the ISTA was generated using the temporary key, determine other LTF sequences for LTFs of another NDP, wherein the other LTF sequences are determined based on the temporary key, encode the another NDP using the other LTF sequences, and configure the ISTA to transmit the another NDP on the channel. For example, RSTA 804 may determine that UL NDP 814 was encoded using the next key 836 indicated by SAC 824. The RSTA 804 may encode DL NDP 816 and transmit DL NDP 816 to ISTA 802.

Method 1800 may be performed by an ISTA 802, RSTA 804, an apparatus of an ISTA 802, and/or an apparatus of a RSTA 804. One or more of the operations of 1800 may be optional. Method 1800 may include one or more additional operations.

Figure 19:
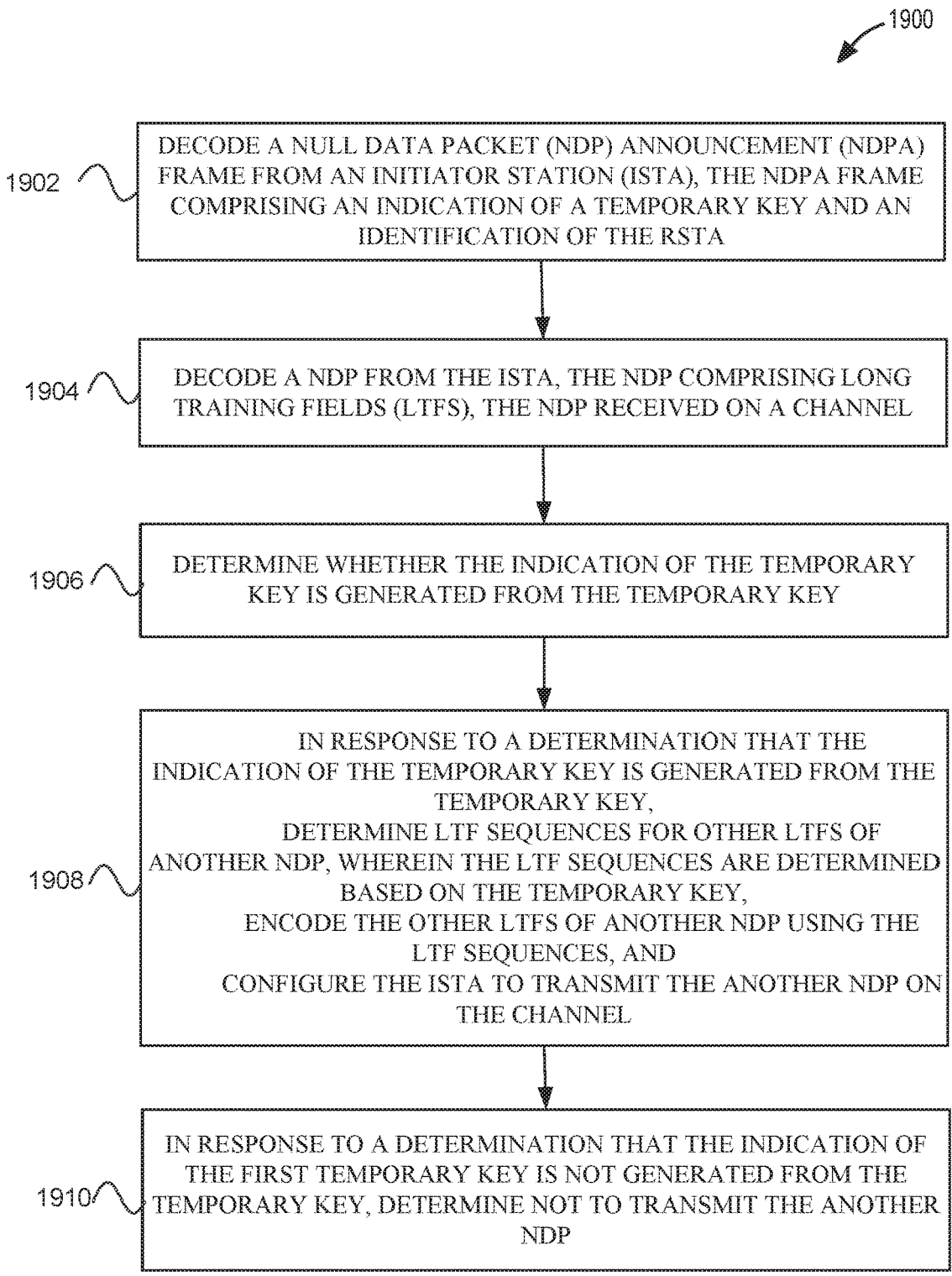
FIG. 19 illustrates a method for protection from counterfeit ranging, in accordance with some embodiments.

FIG. 19 illustrates a method 1900 for protection from counterfeit ranging, in accordance with some embodiments. The method 1900 may begin at operation 1902 with decoding a NDPA frame from an ISTA, the NDPA frame including an indication of a temporary key and an identification of the RSTA. For example, NDPA 810 may include SAC 824 and an indication (not illustrated) of RSTA 804. In another example, where the RSTA is exchanged with ISTA, NDPA 1624 may include auth 1674, which may be a SAC.

The method 1900 may continue at operation 1904 with decoding a NDP from the ISTA, the NDP comprising LTFs, the NDP received on a channel. For example, RSTA 804 may decode UL NDP 814, which includes HEz-LTFs 1108. In another example, where the RSTA is exchanged with the ISTA, ISTAs 1602 may decode DL NDPs 1626. The method 1900 may continue at operation 1906 with determining whether the indication of the temporary key is generated from the temporary key. For example, RSTA 804 may determine if SAC 824 is derived from the next key 836 as disclosed in conjunction with FIGS. 12 and 17. In another example, where RSTA is switched with ISTA, the ISTAs may determine if the auth 1674, which may be a SAC is derived from next key 1694 as described in conjunction with FIGS. 12 and 17.

The method 1900 may continue at operation 1908 with in response to a determination that the indication of the first temporary key is generated from the temporary key, determine LTF sequences for other LTFs of another NDP, where the LTF sequences are determined based on the temporary key, encode the other LTFs of another NDP using the LTF sequences, and configure the ISTA to transmit the another NDP on the channel. For example, RSTA 804 may determine HEz-LTFs 1108 of DL NDP 816 based on generating LTF sequences 1206. The LTF sequences 1206 (as disclosed in conjunction with FIG. 12) may be used to generate the HEz-LTFs 1108 to be phase rotated 8PSK constellation points for each subcarrier of HEz-LTFs 1108 (except some subcarriers for DC and edges may not be used for constellation points.) In some embodiments, the LTF sequences 1206 are phase rotated 8PSK constellation points that are then mapped onto the HEz-LTFs 1108. An apparatus of the RSTA 804 may configure the RSTA 804 to transmit the DL NDP 816.

The method 1900 may continue at operation 1910 with in response to a determination that the indication of the first temporary key is not generated from the temporary key, determine not to transmit the another NDP or in response to a determination that the indication of the first temporary key is not generated from the temporary key, refrain from encoding the other LFT sequences and generating the another NDP for transmission on the channel. For example, an apparatus of the RSTA 804 may determine not to generate or not to transmit the another NDP.

Method 1900 may be performed by an ISTA 802, RSTA 804, an apparatus of an ISTA 802, and/or an apparatus of a RSTA 804. One or more of the operations of 1900 may be optional. Method 1900 may include one or more additional operations.

The following examples provide further embodiments. Example 1 is an apparatus of a responder station (RSTA), the apparatus including memory; and processing circuitry coupled to the memory, the processing circuitry configured to: decode a null data packet (NDP) announcement (NDPA) frame from an initiator station (ISTA), the NDPA frame including an indication of a temporary key, an identification of the RSTA, and an indication of a channel; decode a NDP from the ISTA, the NDP including long training fields (LTFs), where the NDP is received in accordance with the NDPA on the channel; determine whether the indication of the temporary key is generated from the temporary key; in response to a determination that the indication of the temporary key is generated from the temporary key, determine LTF sequences using the temporary key, encode other LTFs of another NDP using the LTF sequences, and configure the RSTA to transmit the another NDP on the channel; and in response to a determination that the indication of the first temporary key is not generated from the temporary key, refrain from encoding the other LFT sequences and generating the another NDP for transmission on the channel.

In Example 2, the subject matter of Example 1 includes, where the processing circuitry is further configured to: determine other LTF sequences for the LTFs of the NDP, where the other LTF sequences are determined using the temporary key; determine channel estimates for the channel, where the channel estimates are based on the other LTF sequences and measured signals from a corresponding LTF of the LTFs; and determine comparisons between pairs of channel estimates of the channel estimates.

In Example 3, the subject matter of Example 2 includes, where if a comparison of the comparisons is below a threshold, a corresponding pair of channel estimates of the pairs of channel estimates are determined to be consistent, and if the comparison of the comparisons is above or equal to the threshold, the corresponding pair of channel estimates are determined to be inconsistent.

In Example 4, the subject matter of Example 3 includes, where the processing circuitry is further configured to: encode a location measurement report (LMR), the LMR including a time of arrival (TOA) and time of departure (TOD) reporting, the TOA and TOD reporting based on a time T2 and a time T3, where the time T2 is when the RSTA received the NDP and the time T3 transmitted the another NDP; determine if the LTFs of the NDP are consistent or inconsistent based on the comparisons between pairs of channel estimates; in response to a determination that the LTFs of the NDP are inconsistent, encode the LMR to comprise an indication that the channel estimates for the channel are invalid; and generate signaling to cause the RSTA to transmit the LMR.

In Example 5, the subject matter of Examples 2-4 includes, where determine channel estimates for the channel further includes: determine channel estimates for each sub-carrier of the channel, where the channel estimates for each sub-carrier of the channel are based on a magnitude and a phase for each sub-carrier determined based on a corresponding LTF sequence of the LTF sequences.

In Example 6, the subject matter of Examples 2-5 includes, where the determine comparisons between pairs of channel estimates of the channel estimates further includes: sum a magnitude or power of a difference between each sub-carrier of a first channel estimate of a pair and a second channel estimate of the pair; and determine the comparison between the first channel estimate and the second channel estimate based on the sum.

In Example 7, the subject matter of Examples 2-6 includes, Phase Shift Keying (PSK) constellation points for each element of a LTF sequence of the other LTF sequences. In Example 8, the subject matter of Examples 1-7 includes, where the processing is further configured to: before the decode the NDPA frame, transmit the indication of the temporary key and the temporary key to the RSTA.

In Example 9, the subject matter of Examples 7-8 includes, where the processing circuitry is further configured to: determine a new temporary key; determine a new indication of the temporary key, where the new indication of the temporary key is determined based on the temporary key; and encode the LMR to further comprise the new temporary key, the new indication of the temporary key, and the indication of the temporary key.

In Example 10, the subject matter of Example 9 includes, where the new indication of the temporary key is further based on one or both of a master key and a dialog token number. In Example 11, the subject matter of Examples 9-10 includes, where the processing circuitry is further configured to: before the generate signaling, encrypt the LMR based on a shared master key, where the shared master key is shared between the ISTA and RSTA.

In Example 12, the subject matter of Examples 1-11 includes, where the ISTA and the RSTA are configured to operate in accordance with one or more of the following communication standards: an Institute of Electrical and Electronic Engineers (IEEE) 802.11ax, an IEEE 802.11 extremely-high throughput (EHT), IEEE 802.11az, and IEEE 802.11. In Example 13, the subject matter of Examples 1-12 includes, transceiver circuitry coupled to the processing circuitry; and one or more antennas coupled to the transceiver circuitry.

Example 14 is a method performed by an apparatus of a responder station (RSTA), the method including: decoding a null data packet (NDP) announcement (NDPA) frame from an initiator station (ISTA), the NDPA frame including an indication of a temporary key and an identification of the RSTA; decoding a NDP from the ISTA, the NDP including long training fields (LTFs), the NDP received on a channel; determining whether the indication of the temporary key is generated from the temporary key: and in response to a determination that the indication of the first temporary key is generated from the temporary key, determining LTF sequences for other LTFs of another NDP, where the LTF sequences are determined based on the temporary key, encoding the other LTFs of another NDP using the LTF sequences, and configuring the ISTA to transmit the another NDP on the channel.

In Example 15, the subject matter of Example 14 includes, where the method further includes: determining other LTF sequences for the LTFs of the NDP, where the other LTF sequences are determined using the temporary key; determining channel estimates for the channel, where the channel estimates are based on the other LTF sequences and measured signals from a corresponding LTF of the LTFs; and determining comparisons between pairs of channel estimates of the channel estimates, where if a comparison of the comparisons is below a threshold, a corresponding pair of channel estimates of the pairs of channel estimates are determined to be consistent, and if the comparison of the difference is above or equal to the threshold, the corresponding pair of channel estimates are determined to be inconsistent.

Example 16 is a non-transitory computer-readable storage medium that stores instructions for execution by one or more processors of an apparatus of a responder station (RSTA), the instructions to configure the one or more processors to: decode a null data packet (NDP) announcement (NDPA) frame from an initiator station (ISTA), the NDPA frame including an indication of a temporary key and an identification of the RSTA; decode a NDP from the ISTA, the NDP including long training fields (LTFs), the NDP is received in accordance with the NDPA on a channel; determine whether the indication of the temporary key is generated from the temporary key; in response to a determination that the indication of the temporary key is generated from the temporary key, determine LTF sequences based on the temporary key, encode other LTFs of another NDP using the LTF sequences, and configure the RSTA to transmit the another NDP on the channel; and in response to a determination that the indication of the first temporary key is not generated from the temporary key, refrain from encoding the other LFT sequences and generating the another NDP for transmission on the channel.

In Example 17, the subject matter of Example 16 includes, where determine channel estimates for the channel further includes: determine other LTF sequences for the LTFs of the NDP, where the other LTF sequences are determined using the temporary key; determine channel estimates for the channel, where the channel estimates are based on the other LTF sequences and measured signals from a corresponding LTF of the LTFs; and determine comparisons between pairs of channel estimates of the channel estimates.

In Example 18, the subject matter of Example 17 includes, where if a comparison of the comparisons is below a threshold, a corresponding pair of channel estimates of the pairs of channel estimates are determined to be consistent, and if the comparison of the difference is above or equal to the threshold, the corresponding pair of channel estimates are determined to be inconsistent.

In Example 19, the subject matter of Example 18 includes, where the instructions further configure the one or more processors to: encode a location measurement report (LMR), the LMR including a time of arrival (TOA) and time of departure (TOD) reporting, the TOA and TOD reporting based on a time T2 and a time T3, where the time T2 is when the RSTA received the NDP and the time T3 transmitted the another NDP; determine if the LTFs of the NDP are consistent or inconsistent based on the comparisons between pairs of channel estimates; in response to a determination that the LTFs of the NDP are inconsistent, encode the LMR to comprise an indication that the channel estimates for the channel are invalid; and generate signaling to cause the ISTA to transmit the LMR.

In Example 20, the subject matter of Examples 17-19 includes, where the instructions further configure the one or more processors to: determine channel estimates for each sub-carrier of the channel, where the channel estimates for each sub-carrier of the channel are based on a magnitude and a phase for each sub-carrier determined based on a corresponding LTF sequence of the LTF sequences.

Example 21 is an apparatus of a responder station (RSTA), the apparatus including: means for decoding a null data packet (NDP) announcement (NDPA) frame from an initiator station (ISTA), the NDPA frame including an indication of a temporary key, an identification of the RSTA, and an indication of a channel; means for decoding a NDP from the ISTA, the NDP including long training fields (LTFs), where the NDP is received in accordance with the NDPA on the channel; means for determining whether the indication of the temporary key is generated from the temporary key; in response to a determination that the indication of the temporary key is generated from the temporary key, means for determining LTF sequences using the temporary key, means for encoding other LTFs of another NDP using the LTF sequences, and means for configuring the RSTA to transmit the another NDP on the channel; and in response to a determination that the indication of the first temporary key is not generated from the temporary key, means for refraining from encoding the other LFT sequences and generating the another NDP for transmission on the channel.

In Example 22, the subject matter of Example 21 includes, where the apparatus further includes: means for determining other LTF sequences for the LTFs of the NDP, where the other LTF sequences are determined using the temporary key; means for determining channel estimates for the channel, where the channel estimates are based on the other LTF sequences and measured signals from a corresponding LTF of the LTFs; and determine comparisons between pairs of channel estimates of the channel estimates.

In Example 23, the subject matter of Examples 21-22 includes, where if a comparison of the comparisons is below a threshold, a corresponding pair of channel estimates of the pairs of channel estimates are determined to be consistent, and if the comparison of the comparisons is above or equal to the threshold, the corresponding pair of channel estimates are determined to be inconsistent.

In Example 24, the subject matter of Example 23 includes, where the apparatus further includes: means for encoding a location measurement report (LMR), the LMR including a time of arrival (TOA) and time of departure (TOD) reporting, the TOA and TOD reporting based on a time T2 and a time T3, where the time T2 is when the RSTA received the NDP and the time T3 transmitted the another NDP; means for determining if the LTFs of the NDP are consistent or inconsistent based on the comparisons between pairs of channel estimates; in response to a determination that the LTFs of the NDP are inconsistent, means for encoding the LMR to comprise an indication that the channel estimates for the channel are invalid; and means for generating signaling to cause the RSTA to transmit the LMR.

In Example 25, the subject matter of Examples 22-24 includes, where determine channel estimates for the channel further includes: determine channel estimates for each sub-carrier of the channel, where the channel estimates for each sub-carrier of the channel are based on a magnitude and a phase for each sub-carrier determined based on a corresponding LTF sequence of the LTF sequences.

In Example 26, the subject matter of Examples 22-25 includes, where the determine comparisons between pairs of channel estimates of the channel estimates further includes: sum a magnitude or power of a difference between each sub-carrier of a first channel estimate of a pair and a second channel estimate of the pair; and determine the comparison between the first channel estimate and the second channel estimate based on the sum.

In Example 27, the subject matter of Examples 22-26 includes, Phase Shift Keying (PSK) constellation points for each element of a LTF sequence of the other LTF sequences.

In Example 28, the subject matter of Examples 21-27 includes, where the apparatus further includes: before the decode the NDPA frame, means for transmitting the indication of the temporary key and the temporary key to the RSTA.

In Example 29, the subject matter of Examples 27-28 includes, where the apparatus further includes: means for determining a new temporary key; means for determining a new indication of the temporary key, where the new indication of the temporary key is determined based on the temporary key, and means for encoding the LMR to further comprise the new temporary key, the new indication of the temporary key, and the indication of the temporary key.

In Example 30, the subject matter of Example 29 includes, where the new indication of the temporary key is further based on one or both of a master key and a dialog token number. In Example 31, the subject matter of Examples 29-30 includes, where the apparatus further includes: before the generate signaling, means for encrypting the LMR based on a shared master key, where the shared master key is shared between the ISTA and RSTA.

In Example 32, the subject matter of Examples 21-31 includes, herein the ISTA and the RSTA are configured to operate in accordance with one or more of the following communication standards: an Institute of Electrical and Electronic Engineers (IEEE) 802.11ax, an IEEE 802.11 extremely-high throughput (EHT), IEEE 802.11 az, and IEEE 802.11.

Example 33 is at least one machine-readable medium including instructions that, when executed by processing circuitry, cause the processing circuitry to perform operations to implement of any of Examples 1-32. Example 34 is an apparatus including means to implement of any of Examples 1-32. Example 35 is a system to implement of any of Examples 1-32. Example 36 is a method to implement of any of Examples 1-32.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a responder station (RSTA), the apparatus comprising memory; and processing circuitry coupled to the memory, the processing circuitry configured to:
    decode a null data packet (NDP) announcement (NDPA) frame from an initiator station (ISTA), the NDPA frame comprising a sequence authentication code (SAC) and an association identification (AID) of the RSTA;
    decode an uplink (UL) NDP from the ISTA, the UL NDP comprising first long training fields (LTFs), wherein the NDP is decoded using LTF generation information indicated by the SAC;
    encode a downlink (DL) NDP based on second LTFs generated using the LTF generation information;
    configure the RSTA to transmit the DL NDP to the ISTA;
    perform an integrity check on the UL NDP to verify that the UL NDP was generated from the LTF generation information;
    in response to a determination that the UL NDP was not generated from the LTF generation information, encode a location measurement report (LMR) comprising an invalid measurement field indicating the UL NDP was not generated from the LTF generation information;
    in response to a determination that the UL NDP was generated from the LTF generation information, encode the LMR comprising the invalid measurement field indicating the UL NDP was generated from the LTF generation information; and
    configure the RSTA to transmit the LMR to the ISTA.

2. The apparatus of claim 1, wherein the processing circuitry is further configured to:
    generate another LTF sequence generation information; and
    generate another LTF generation SAC, wherein encode the LMR further comprises:
    encode the LMR to comprises an indication of the another LTF sequence generation information and an indication of the another LTF generation SAC.

3. The apparatus of claim 2, wherein the processing circuitry is further configured to:
encode the LMR to further comprise the SAC.

4. The apparatus of claim 1, wherein the processing circuitry is further configured to:
decode a fine timing measurement (FTM) request frame, the FTM request frame comprising a master key and a field indicating secure LTF is required.

5. The apparatus of claim 1, wherein the processing circuitry is further configured to:
encode a FTM response frame, the FTM response frame comprising the SAC and the LTF generation information.

6. The apparatus of claim 4, wherein the processing circuitry is further configured to:
determine the LTF generation information based on the master key.

7. The apparatus of claim 6, wherein the processing circuitry is further configured to:
determine the SAC based on the master key.

8. The apparatus of claim 1, wherein the NDPA further comprises a sounding dialog token field, the sounding dialog token field indicating an iteration of fine timing measurement.

9. The apparatus of claim 1, wherein the first LTFs and the second LTFs are high-efficiency (HE)z LTFs (HEz-LTFs).

10. The apparatus of claim 1, wherein perform the integrity check on the UL NDP to verify that the UL NDP was generated from the LTF generation information further comprises:
determine random LTF sequences for the first LTFs of the UL NDP, wherein the random LTF sequences are determined based on the LTF generation information;
determine channel estimates for the first LTFs based on the LTF sequences and measured signals from receiving the first LTFs; and
verify whether the UL NDP was generated from the LTF generation information based on comparing the channel estimates with one another.

11. The apparatus of claim 10, wherein verify whether the UL NDP was generated from the LTF generation information based on comparing the channel estimates with one another further comprises:
sum a magnitude or power of a difference between each sub-carrier of a first LTF of the first LTFs of a first channel estimate of a pair of channel estimates of the channel estimates and a second channel estimate of the pair; and
determine the comparison between the first channel estimate and the second channel estimate based on the sum.

12. The apparatus of claim 11, wherein the processing circuitry is further configured to:
determine LTF sequences for the second LTFs, wherein the LTFs sequences are phase rotated 8 Phase Shift Keying (PSK) constellation points for each subcarrier of a LTF sequence of the LTF sequences.

13. The apparatus of claim 12, wherein the LTF sequences comprises one or more of the following group: 0, −1, and 0.

14. The apparatus of claim 11, wherein encode the LMR further comprises:
encode the LMR to comprising a time of arrival (TOA) and time of departure (TOD) reporting, the TOA and TOD reporting based on a time T2 and a time T3, wherein the time T2 is when the RSTA received the UL NDP and the time T3 is when the RSTA transmitted the DL NDP.

15. The apparatus of claim 11, wherein the ISTA and the RSTA are configured to operate in accordance with one or more of the following communication standards: an Institute of Electrical and Electronic Engineers (IEEE) 802.11ax, an IEEE 802.11 extremely-high throughput (EHT), IEEE 802.11az, and IEEE 802.11.

16. The apparatus of claim 1, further comprising a direct conversion mixer, the direct conversion mixer configured to directly downconvert radio frequency (RF) signals to baseband signals,
wherein the processing circuitry is configured to decode the baseband signals, the baseband signals including the NDPA frame.

17. A method performed by an apparatus of a responder station (RSTA), the method comprising:
decoding a null data packet (NDP) announcement (NDPA) frame from an initiator station (ISTA), the NDPA frame comprising a sequence authentication code (SAC) and an association identification (AID) of the RSTA;
decoding an uplink (UL) NDP from the ISTA, the UL NDP comprising first long training fields (LTFs), wherein the NDP is decoded using LTF generation information indicated by the SAC;
encoding a downlink (DL) NDP based on second LTFs generated using the LTF generation information;
configuring the RSTA to transmit the DL NDP to the ISTA;
performing an integrity check on the UL NDP to verify that the UL NDP was generated from the LTF generation information;
in response to a determination that the UL NDP was not generated from the LTF generation information, encoding a location measurement report (LMR) comprising an invalid measurement field indicating the UL NDP was not generated from the LTF generation information;
in response to a determination that the UL NDP was generated from the LTF generation information, encoding the LMR comprising the invalid measurement field indicating the UL NDP was generated from the LTF generation information; and
configure the RSTA to transmit the LMR to the ISTA.

18. The method of claim 17, wherein the method further comprises:
generating another LTF sequence generation information; and
generating another LTF generation SAC, wherein encode the LMR further comprises:
encoding the LMR to comprises an indication of the another LTF sequence generation information and an indication of the another LTF generation SAC.

19. A non-transitory computer-readable storage medium that stores instructions for execution by one or more processors of an apparatus of a responder station (RSTA), the instructions to configure the one or more processors to:
decode a null data packet (NDP) announcement (NDPA) frame from an initiator station (ISTA), the NDPA frame comprising a sequence authentication code (SAC) and an association identification (AID) of the RSTA;
decode an uplink (UL) NDP from the ISTA, the UL NDP comprising first long training fields (LTFs), wherein the NDP is decoded using LTF generation information indicated by the SAC;
encode a downlink (DL) NDP based on second LTFs generated using the LTF generation information;
configure the RSTA to transmit the DL NDP to the ISTA;

perform an integrity check on the UL NDP to verify that the UL NDP was generated from the LTF generation information;

in response to a determination that the UL NDP was not generated from the LTF generation information, encode a location measurement report (LMR) comprising an invalid measurement field indicating the UL NDP was not generated from the LTF generation information;

in response to a determination that the UL NDP was generated from the LTF generation information, encode the LMR comprising the invalid measurement field indicating the UL NDP was generated from the LTF generation information; and configure the RSTA to transmit the LMR to the ISTA.

20. The non-transitory computer-readable storage medium of claim 19, wherein the instructions further configure the one or more processors to:

generate another LTF sequence generation information; and generate another LTF generation SAC, wherein encode the LMR further comprises:

encode the LMR to comprises an indication of the another LTF sequence generation information and an indication of the another LTF generation SAC.

* * * * *